US010436888B2

(12) United States Patent
Li et al.

(10) Patent No.: US 10,436,888 B2
(45) Date of Patent: Oct. 8, 2019

(54) HYBRID FMCW-INTERFEROMETRY RADAR FOR POSITIONING AND MONITORING AND METHODS OF USING SAME

(71) Applicant: TEXAS TECH UNIVERSITY SYSTEM, Lubbock, TX (US)

(72) Inventors: Changzhi Li, Lubbock, TX (US); Guochao Wang, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 314 days.

(21) Appl. No.: 15/315,299

(22) PCT Filed: May 29, 2015

(86) PCT No.: PCT/US2015/033408
§ 371 (c)(1),
(2) Date: Nov. 30, 2016

(87) PCT Pub. No.: WO2015/184406
PCT Pub. Date: Dec. 3, 2015

(65) Prior Publication Data
US 2017/0102457 A1    Apr. 13, 2017

Related U.S. Application Data

(60) Provisional application No. 62/005,647, filed on May 30, 2014.

(51) Int. Cl.
*G01S 13/34*    (2006.01)
*G01S 7/35*    (2006.01)
(Continued)

(52) U.S. Cl.
CPC .............. *G01S 13/341* (2013.01); *G01S 7/10* (2013.01); *G01S 7/35* (2013.01); *G01S 7/415* (2013.01);
(Continued)

(58) Field of Classification Search
CPC ........ G01S 7/415; G01S 13/86; G01S 13/862; G01S 13/865; G01S 13/867; G01S 13/88; G01S 13/888
See application file for complete search history.

(56) References Cited

U.S. PATENT DOCUMENTS 5,774,091 A * 6/1998 McEwan .................. G01C 3/08
342/126
6,177,903 B1 * 1/2001 Fullerton ................ G01S 7/003
342/21

(Continued)

OTHER PUBLICATIONS

Wang et al., "Hybrid FMCW Interferometry in in the 5.8 GHz ISM band for indoor precise position and motion detection",IEEE—MTTS International Microwave Symposium. Digest, IEEE, US, Jun. 2, 2013 (Jun. 2, 2013), pp. 1-4, XP032546146JSSN: 0149-645X, DOI: 10.1109/MWSYM. 2013.6697623 (Year: 2013).*

(Continued)

*Primary Examiner* — Peter M Bythrow
(74) *Attorney, Agent, or Firm* — Dickinson Wright PLLC; Kristopher Lance Anderson

(57) ABSTRACT

Disclosed is a system and method for a hybrid radar system that integrates frequency-modulated continuous wave (FMCW) mode and interferometry mode. The radar works as a time division system that continuously switches between the FMCW mode and interferometry mode. The FMCW mode is responsible for absolute range detection and the interferometry mode takes cares of the weak physiological movement monitoring. The respective accuracies in range detection and displacement measurement complements the advantages of the two radar modes, providing (Continued)

versatile performance. By steering the antenna beam, the proposed radar system becomes an ideal solution for indoor health care, human localization, and human-computer interaction. Objects or human targets with or without stationary clutters can be precisely located. At the same time, the targets' vital signs and gestures can be monitored.

24 Claims, 19 Drawing Sheets

(51) Int. Cl.
    *G01S 13/536*      (2006.01)
    *G01S 13/56*      (2006.01)
    *G01S 13/58*      (2006.01)
    *G01S 13/88*      (2006.01)
    *G01S 7/10*      (2006.01)
    *G01S 7/41*      (2006.01)

(52) U.S. Cl.
    CPC .......... *G01S 13/343* (2013.01); *G01S 13/536* (2013.01); *G01S 13/56* (2013.01); *G01S 13/584* (2013.01); *G01S 13/886* (2013.01)

(56) References Cited

U.S. PATENT DOCUMENTS

| | | | | |
|---|---|---|---|---|
| 7,725,150 B2* | 5/2010 | Tupin, Jr. | ................ | A61B 5/05 |
| | | | | 382/128 |
| 8,033,996 B2* | 10/2011 | Behar | ................ | A61B 5/0002 |
| | | | | 600/300 |
| 8,314,732 B2* | 11/2012 | Oswald | ................ | G01S 7/2926 |
| | | | | 342/114 |
| 8,344,949 B2* | 1/2013 | Moshfeghi | ............ | G01S 5/0263 |
| | | | | 342/457 |
| 9,019,150 B2* | 4/2015 | Alalusi | ................ | G01S 7/03 |
| | | | | 342/118 |
| 9,024,814 B2* | 5/2015 | Bangera | ................ | G06Q 30/02 |
| | | | | 340/573.1 |
| 9,335,825 B2* | 5/2016 | Rautiainen | ............. | G06F 3/017 |
| 2008/0316085 A1* | 12/2008 | Rofougaran | .......... | A63F 13/235 |
| | | | | 342/22 |
| 2009/0262006 A1* | 10/2009 | McNeill | ................ | G01S 7/35 |
| | | | | 342/22 |
| 2009/0322673 A1* | 12/2009 | Cherradi El Fadili | | ................ |
| | | | | G06F 3/017 |
| | | | | 345/157 |
| 2011/0181510 A1* | 7/2011 | Hakala | ................ | G06F 3/017 |
| | | | | 345/158 |
| 2011/0234492 A1* | 9/2011 | Ajmera | ................ | G06F 3/017 |
| | | | | 345/158 |
| 2012/0068876 A1* | 3/2012 | Bangera | ................ | G01S 7/415 |
| | | | | 342/27 |
| 2012/0280900 A1* | 11/2012 | Wang | ................ | G06F 3/0488 |
| | | | | 345/156 |
| 2013/0113647 A1* | 5/2013 | Sentelle | ................ | G01S 13/32 |
| | | | | 342/22 |
| 2013/0169471 A1* | 7/2013 | Lynch | ................ | G01S 7/352 |
| | | | | 342/107 |
| 2014/0028539 A1* | 1/2014 | Newham | ............... | G06F 1/1694 |
| | | | | 345/156 |
| 2015/0277569 A1* | 10/2015 | Sprenger | ................ | G06F 3/017 |
| | | | | 345/156 |
| 2015/0301167 A1* | 10/2015 | Sentelle | ............. | A61B 5/0205 |
| | | | | 342/22 |
| 2017/0102457 A1* | 4/2017 | Li | ................ | G01S 7/35 |

* cited by examiner (a)

HYBRID FMCW-INTERFEROMETRY RADAR FOR POSITIONING AND MONITORING AND METHODS OF USING SAME

CROSS-REFERENCE TO RELATED APPLICATIONS

This application claims priority to: provisional U.S. Patent Application Ser. No. 62/005,647, filed on May 30, 2014, entitled "Hybrid FMCW-Interferometry Radar for Positioning and Monitoring and Methods of Using Same," which provisional patent application is commonly assigned to the Assignee of the present invention and is hereby incorporated herein by reference in its entirety for all purposes.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

TECHNICAL FIELD

The present invention relates in general to the field of localization and monitoring. In particular, the system provides for electronic subject localization and activity monitoring applications. The disclosed systems and methods support a wide variety of scenarios and includes various products and services.

STATEMENT OF FEDERALLY FUNDED RESEARCH

None.

BACKGROUND OF THE INVENTION

Indoor sensors for subject localization and monitoring are currently carried out primarily by contact sensors such as transducers and/or optical image sensors. In most cases, such as for long-term health care, people are reluctant to wear contact sensors all the time, which may, at times, limit the applications of contact sensors mainly to emergency usage. Optic-based techniques, such as closed-circuit television (CCTV) and infrared camera, have been widely used in homeland security and surveillance. The recent advancement in the use of optical video such as KINECT® can provide an accurate depth image and has potential for uses in many applications. However, despite the great success they have achieved, optic-based techniques still suffer from several limitations. Although video can provide pictures with volume and detailed data, it is not good at revealing certain other information such as vital sign information (e.g. pulse, blood pressure, etc.) due to, among other reasons, the inadequate image resolution. Additionally, optical sensors can be easily blocked by obstacles between the target and sensors, hence require direct exposure and suffer from blind zone problems. On the contrary, non-contact microwave radar sensors have advantages over other alternatives. First, microwave radar is more sensitive in with respect to certain vital signs because it can provide millimeter or even sub-millimeter scale accuracy. Second, microwave sensors do not rely on light and can penetrate walls and other obstacles. Third, the Doppler and micro-Doppler characteristics reveal extra details of motion, and thus enable gesture recognition.

However, there are still limitations for current microwave radar sensor such that it cannot fully handle real time individual life activities. The greatest challenge for the microwave radar sensor is how to provide sufficient range detection and displacement monitoring accuracy at a low cost. There are several mainstream radar architectures that is found in literature, i.e., Doppler (interferometry) radars, impulse-radio ultra-wideband (IR-UWB) radars, frequency modulated continuous wave (FMCW) radar and stepped frequency modulated continuous wave (SFCW) radar. Doppler radars operate based on single tone continuous wave to obtain phase history. They have been widely used because of their high precision in displacement measurement. However, they cannot detect range information with sufficient accuracy. Their inability to spatially distinguish multiple targets limits their applications mainly to indoor vital sign monitoring and gesture recognition. IR-UWB, FMCW and SFCW radars are capable of providing range information. However, their range resolution is highly dependent on the bandwidth transmitted, forcing most of the systems to work at high frequencies for the resolution required by life activities monitoring. Great efforts must be made to overcome the problems associated with high frequency and wide bandwidth (e.g., linearity and frequency drift problems), not to mention the high cost, complexity, and high attenuation it suffers.

SUMMARY OF THE INVENTION

The present invention addresses failings in the art by providing a system and method for a novel radar system for precise two-dimensional positioning and life activities surveillance. Indoor short-range high-accuracy radar sensors can serve as an important cyber chamberlain that provides services including but not limited to (1) positioning and navigation; (2) home security; (3) remote real time health care; (4) wireless user interface (UI) and (5) entertainment based on fully non-contact body gaming. Capable of operating in varying frequencies and bandwidth, the radar system incorporates the FMCW mode and the interferometry mode based on a continuous waveform. The FMCW mode is responsible for range detection while the interferometry mode is for tiny physiological motion monitoring, which may include gestures and other minor discrete movements. Such a strategy is devised because FMCW can provide range information and interferometry radar is advantageous in relative displacement (e.g., physiological motion) detection. Moreover, they can share the same RF front end because they are both based on CW operation. To achieve high isolation, the transmit (TX) and receive (RX) antennas were separated and both of them have a high gain and low side lobe. Mechanical antenna rotation was employed to acquire the azimuth information. Thus the proposed radar system is capable of scanning 360° with an angular step size of 5.625° to locate objects.

The challenge of the proposed application is to differentiate living organisms, such as people, from stationary clutters, especially when people remain relatively stationary (e.g., when reading, watching TV, or sleeping). In these cases, without the range history information it is difficult to locate an living organism's position since the organism remains in certain range bin just as stationary clutters do. It is therefore an object of the present invention to differentiate living organisms, such as humans, or target subjects from surrounding stationary clutters by the cooperation of the FMCW mode and the interferometry mode. Interferometry mode is utilized to quickly determine the azimuth direction of a living organism. When there are both target subjects and clutters along the same line-of-sight (LOS), the coherent chirp signal employed in the present invention can distinguish human from clutters based on tiny changes in phase history. Therefore, the radar system of the present invention is fully capable of locating target subjects and monitoring their life activities with accuracy. Additionally, possessing high accuracy in Doppler information enables the proposed radar system to recognize a target subject's gestures and to further provide a non-contact interface between people and devices.

It is therefore an object of the present invention to provide a system for detecting the range information of objects in a room, and thus obtain in real-time a 2-dimensional map of the room with objects' location information. It is another object of the present invention to differentiate between human objects, or target subjects, and stationary clutters (such as furniture and computers) based on vital signs, such as pulse, blood pressure, and the like. It is yet another object of the present invention to further detect the gesture of target subjects (such as waving a hand from left to right, from right to left, or the nod of a head), based on which utilities (e.g. lights, air conditioner) can be controlled.

It is another object of the present invention to provide A method for object localization and monitoring, comprising the steps of: transmitting, via a computing device, a first signal comprising frequency modulated continuous wave (FMCW) signal; transmitting, via the computing device and concurrent with the transmission of said first signal, a second signal, said second signal comprising a single-tone interferometry signal; receiving, via the computing device, a third signal comprising an FMCW signal; receiving, via the computing device, a fourth signal comprising a single-tone interferometry signal; determining, via the computing device, signal information associated with said received third signal and said received fourth signal; calculating, via the computing device, range and displacement information respective to the computing device based on said signal information; and visibly displaying, on a display associated with said computing device, range, displacement and gesture recognition based on the calculated range and displacement information.

It is another object of the present invention to provide a non-transitory computer-readable storage medium tangibly encoded with computer-executable instructions, that when executed by a processor associated with a computing device, performs a method of object localization and monitoring, comprising: transmitting a first signal comprising frequency modulated continuous wave (FMCW) signal; transmitting, concurrent with the transmission of said first signal, a second signal, said second signal comprising a single-tone interferometry signal; receiving a third signal comprising an FMCW signal; receiving a fourth signal comprising a single-tone interferometry signal; determining signal information associated with said received third signal and said received fourth signal; calculating range and displacement information respective to the computing device based on said signal information; and visibly displaying, on a display associated with said computing device, range, displacement and gesture recognition based on the calculated range and displacement information.

It is a further object of the present invention to provide a system comprising: a computing device comprising: memory storing computer-executable instructions; and one or more processors for executing said computer-executable instructions for: transmitting a first signal comprising frequency modulated continuous wave (FMCW) signal; transmitting concurrent with the transmission of said first signal, a second signal, said transmission comprising a single-tone interferometry signal; receiving a third signal comprising an FMCW signal; receiving a fourth signal comprising a single-tone interferometry signal; determining signal information associated with said received third signal and said received fourth signal; calculating range and displacement information respective to the computing device based on said signal information; and visibly displaying, on a display associated with said computing device, range, displacement, clutter, and gesture recognition based on the calculated range and displacement information for object localization, physiological and movement monitoring.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the present invention will be apparent from the following description of embodiments as illustrated in the accompanying drawings, in which reference characters refer to the same parts throughout the various views. The drawings are not necessarily to scale, emphasis instead being placed upon illustrating principles of the present invention.

DETAILED DESCRIPTION OF THE INVENTION

Figure 1:
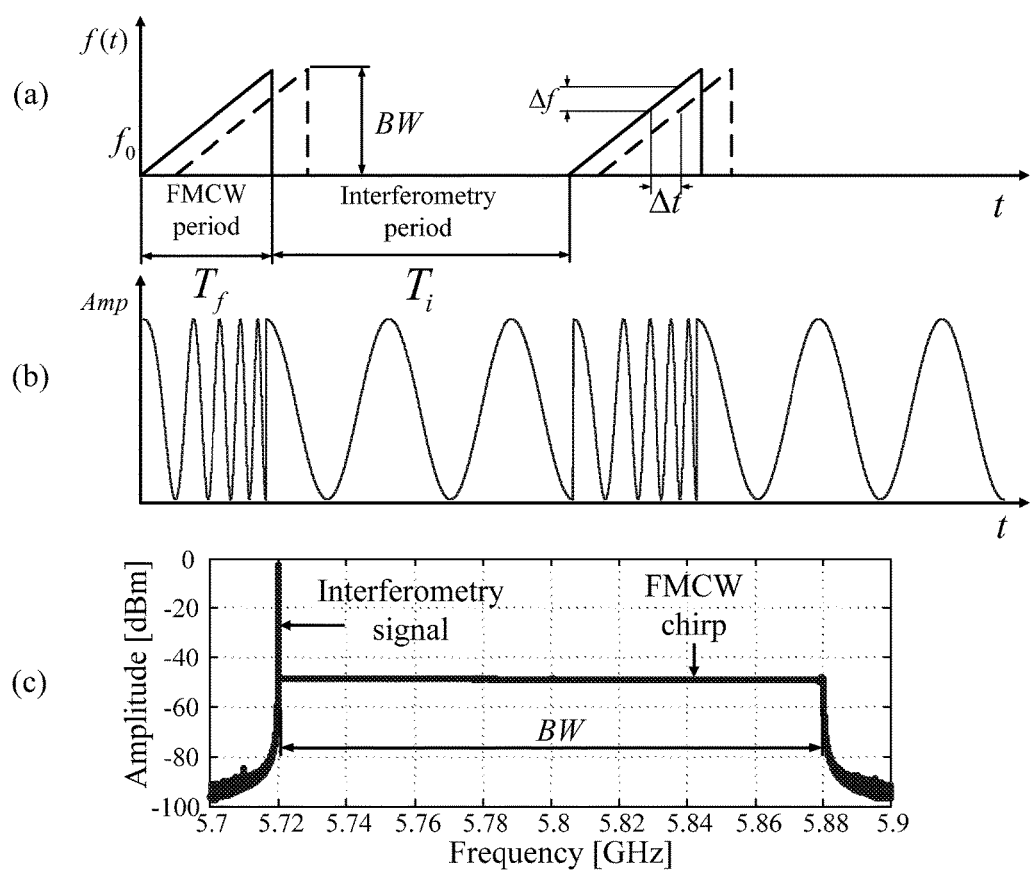
FIG. 1 depicts the proposed hybrid transmitted signal: (a) frequency domain, (b) time domain and (c) spectrum from the literature.

While the making and using of various embodiments of the present invention are discussed in detail below, it should be appreciated that the present invention provides many applicable inventive concepts that can be embodied in a wide variety of specific contexts, goods, or services. The specific embodiments discussed herein are merely illustrative of specific ways to make and use the present invention and do not delimit the scope of the present invention.

All publications and patent applications mentioned in the specification are indicative of the level of skill of those skilled in the art to which the present invention pertains. All publications and patent applications are herein incorporated by reference to the same extent as if each individual publication or patent application was specifically and individually indicated to be incorporated by reference.

The present invention will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present invention is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of the present invention the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, including a software server, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of the present invention a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of the present invention a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

For purposes of the present invention, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), North American/CEPT frequencies, radio frequencies, single sideband, radiotelegraphy, radioteletype (RTTY), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of the present invention, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a mobile device may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages. The client device, mobile device, or wireless communication device, in accordance with the present invention may be a portable or mobile telephone, a Personal Digital Assistant (PDA), a wireless video or multimedia device, a portable computer, an embedded communication processor or similar wireless communication device. In the following description, the communication device will be referred to generally as User Equipment (UE) for illustrative purposes and it is not intended to limit the present invention to any particular type of communication device. Certain modern handheld electronic devices (UE) comprise the necessary components to connect to a cellular network, such as a 2G, 2.5G, 3G, and/or LTE network, and the necessary components to connect to a non-cellular IP Connectivity Access Network (IP CAN) such as a wireless LAN network (e.g. IEEE 802.11a/b/g/n) or a wired LAN network (e.g. IEEE 802.3).

The principles discussed herein may be embodied in many different forms. The preferred embodiments of the present invention will now be described where for completeness, reference should be made at least to the Figures.

Thus, based on the above foundational discussion, in addition to the detailed discussion below, the present invention describes systems and methods for hybrid radar system that integrates frequency-modulated continuous wave (FMCW) mode and interferometry mode. The radar works as a time division system that continuously switches between the FMCW mode and interferometry mode. The FMCW mode is responsible for absolute range detection and the interferometry mode takes cares of the weak physiological movement monitoring. The respective accuracies in range detection and displacement measurement complements the advantages of the two radar modes, providing versatile performance.

FIG. 1 shows the transmitted signal of the system of the present invention in frequency domain (FIG. 1(a)) and time domain (FIG. 1(b)) respectively. FIG. 1(c) illustrates the spectrum of the transmitted signal. In time domain, the FMCW signal has the same amplitude as that of the interferometry signal. Basically, the proposed modulated signal is a sequence of chirp period embedded into single-tone interferometry signal. For the purposes of the present invention, a chirp period is a sequence of an FMCW signal, which may also be referred to as a chirp signal. Therefore, the system is a time division (TD) system that switches between FMCW mode and interferometry mode. The FMCW signal (chirp signal) is an up-ramp linear frequency-modulated signal while the interferometry signal has a fixed operating frequency. The duration time of the chirp signal and the interferometry signal are $T_f$ and $T_i$ respectively. By mixing a local copy of the transmitted signal with the received signal backscattered by the target, the baseband signal contains a series of FMCW baseband signal and interferometry baseband signal. Simulation results are presented to explain the operating principles. All simulations share the same system parameters which are exactly the same to the examples presented herein: operating frequency ranges from 5.72 GHz to 5.88 GHz, $T_f$=2 ms, $T_i$=98 ms, although the same methodology set forth in these exemplary embodiments can be applied to other frequencies with a different bandwidth. A simulated time domain baseband output when detecting a target located 2 m away from the radar is shown in FIGS. 2(a) and (b). To distinguish the two types of baseband signals, in the present invention, the baseband output during the FMCW period is called beat signal because it contains a beat frequency, and the baseband output during the interferometry period is called interferometry signal.

The beat signal and interferometry signal alternately show up at the receiver baseband output. Therefore, the first step of signal processing is to extract integral beat signals and rebuild the interferometry signal, which are used to provide range information and displacement information respectively. As shown in FIG. 2(b), the variation of the interferometry signal is much slower than that of the beat signal. This is the basis to isolate the beat signal from interferometry signal: a sliding window with a length of $T_f$ (same size as a beat signal duration) is applied to calculate the standard deviation of baseband output in that window. The position of the largest sliding window corresponds to the location of the beat signal. This procedure is only taken once to find the first beat signal. Based on the location of the first beat signal and the beat signal interval the rest of the beat signals can be easily located. It should be noted that strict clock synchronization is necessary between the signal generator, the digitizer, and the baseband signal processor. Otherwise the difference between two clock rates will accumulate and eventually misalign the actual location of the following beat signals.

Range Information from Extracted Beat Signal:

The transmitted complex signal for one chirp period can be expressed as:

$$S_T(t) = \exp(j(2\pi f_c t + \pi \gamma t^2 + \phi))  \quad (1)$$

where $\gamma = BW/T_f$ is the chirp rate, t is the so-called fast-time, and $\phi$ is the initial phase. The waveform is designed so that the chirp signal is phase coherent so $\phi$ is a constant.

Intuitively, the received chirp signal lags behind the transmitted signal with the round-trip time-of-flight (RTTOF). Suppose a point-scatterer whose distance to the radar is $R(\tau)$, where $\tau$ is coherent processing signal, referred to as slow-time. Since $T_f$ is very short compared with the target movement speed, it is safe to assume $R(\tau)$ is a constant during each period of the transmitted chirp. The received signal for one point-scatterer at $R(\tau)$ is thus given by:

$$S_R(t) = \sigma S_T\left(t - \frac{2R(\tau)}{c}\right) \quad (2)$$

where $\sigma$ is the amplitude of the received signal normalized to the transmitted signal. The mixing of a replica of the transmitted signal with the received one is known as "dechirping", and results in the beat signal that can be mathematically expressed as:

$$\begin{aligned} S_b(t) &= S_{T(t)} \times S_R^*(t) \\ &= \sigma \exp(j(f_b t + p_b + \varphi)) \end{aligned} \quad (3)$$

$$f_b = \frac{2\gamma R(\tau)}{c} \quad (4)$$

$$p_b = \frac{2\pi R(\tau)}{c} \quad (5)$$

where $f_b$ is the beat frequency that is proportional to the distance information, $p_b$ is the slow-time phase history, and is the residual phase.

Figure 2:
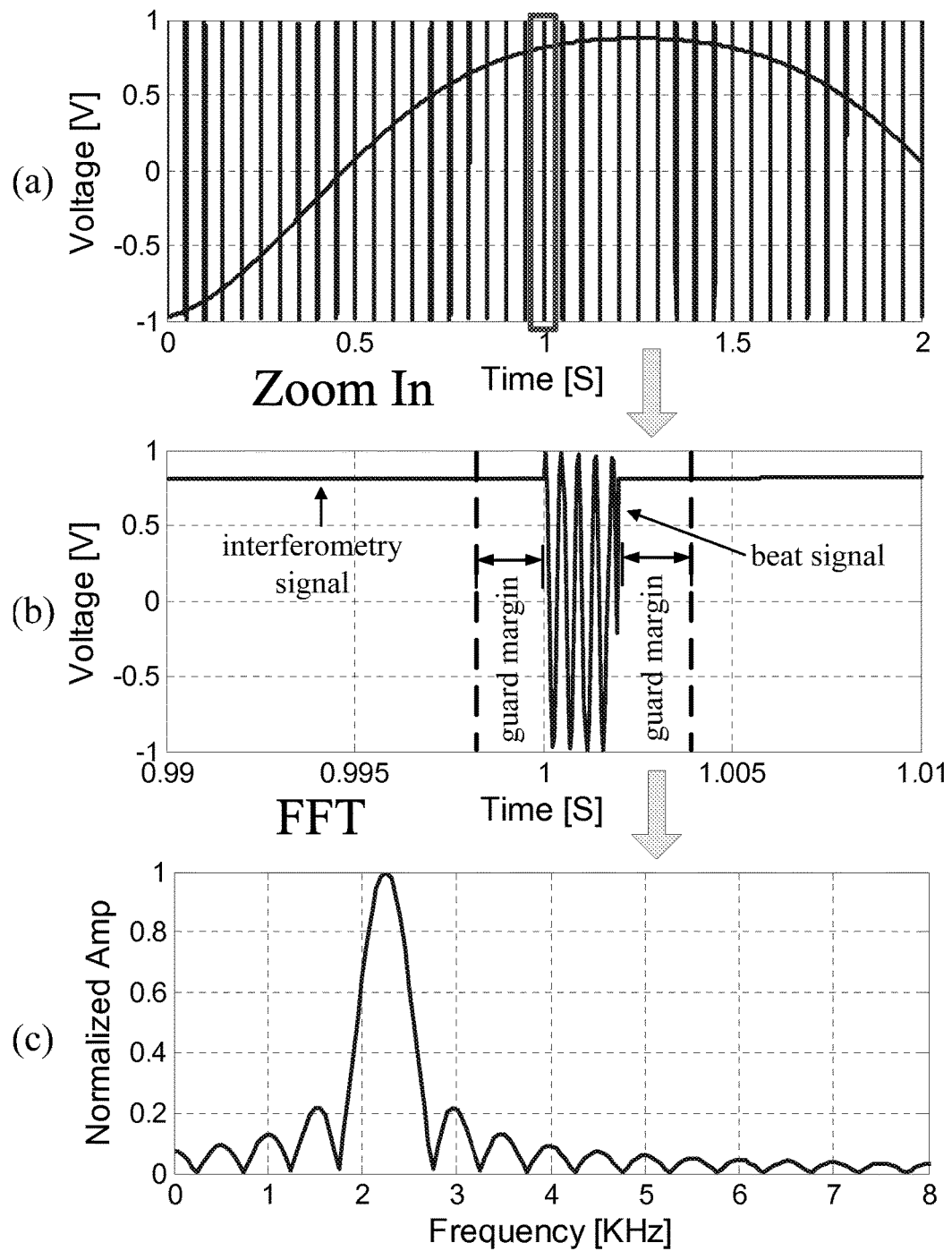
FIG. 2 depicts the procedure of beat signal extraction and beat frequency calculation. (a) The time domain baseband signal, (b) zoom in of the time domain signal with only one burst of beat signal and (c) frequency domain information of the extracted beat signal.

For indoor positioning application of the present invention, the RTTOF is small. Hence the received signal and the replica of the transmitted signal arrive at the down-converter almost simultaneously. As shown in FIG. 2(a), the beat signals occur with a fixed interval. Therefore, once the location of one beat signal is determined, those of the following beat signals can be easily predicted based on the FMCW burst interval. Guard margins are employed before and after the beat signal to make sure an integral beat signal waveform can be recovered. The beat signal extraction procedure is shown in FIG. 2. Although the margins belong to interferometry baseband signal, they are short and almost flat, thus create negligible error to the beat frequency detection.

The extracted I/Q beat signals will be combined together to get a complex signal before applying Fast Fourier Transform (FFT). By applying FFT to a single beat signal instead of a series of repeated beat signals, the fence effect on the obtained spectrum is eliminated, resulting in a better range resolution than analyzing the spectrum of a series of FMCW outputs. However, because of the limited bandwidth (e.g., 160 MHz with 5.8 GHz carrier frequency), the range resolution of FMCW radar still cannot meet the requirement of life activities and/or vital signs monitoring (e.g., detection of breathing and heartbeat signals). To solve this challenge, interferometry signal will be utilized to obtain displacement information.

Displacement Information from Interferometry Signal:

The normalized interferometry-baseband signal of a point-scatterer in baseband I/Q channels can be represented as:

$$B_I(\tau) = \sin\left[\frac{4\pi r(\tau)}{\lambda} + \theta + \Delta\phi(\tau)\right] + DC_I \quad (6)$$

$$B_Q(\tau) = \cos\left[\frac{4\pi r(\tau)}{\lambda} + \theta + \Delta\phi(\tau)\right] + DC_Q \quad (7)$$

where $\lambda = c/f_c$ is the wavelength of the RF carrier, $r(\tau)$ is the displacement of the target in slow-time domain, $\theta$ is a constant residual phase related to the initial distance of the target, $\Delta\phi(\tau)$ is the circuit phase noise, $DC_I$ and $DC_Q$ are the DC levels of the I/Q channels, respectively. It should be noted that the movement $r(\tau)$ is phase-modulated in the cosine and sine trigonometric functions. Therefore, phase demodulation is necessary to recover the phase, and thus movement $r(\tau)$:

$$r(\tau) = \tan^{-1}\left(\frac{B_I(\tau) - DC_I}{B_Q(\tau) - DC_Q}\right) \cdot \lambda/(4\pi) \quad (8)$$

This is known as arc tangent demodulation and is widely employed in interferometry radar due to its robustness to the null point detection issue.

It can be observed from formulas (6) and (7) that the phase change is proportional to $r(\tau)/\lambda$. For 5.8 GHz signal, a small movement can result in significant phase change that can be easily measured. This makes interferometry radar very sensitive and robust in small movement detection. The drawback of this technique is that it possesses no range information because the phase is periodic.

Figure 3:
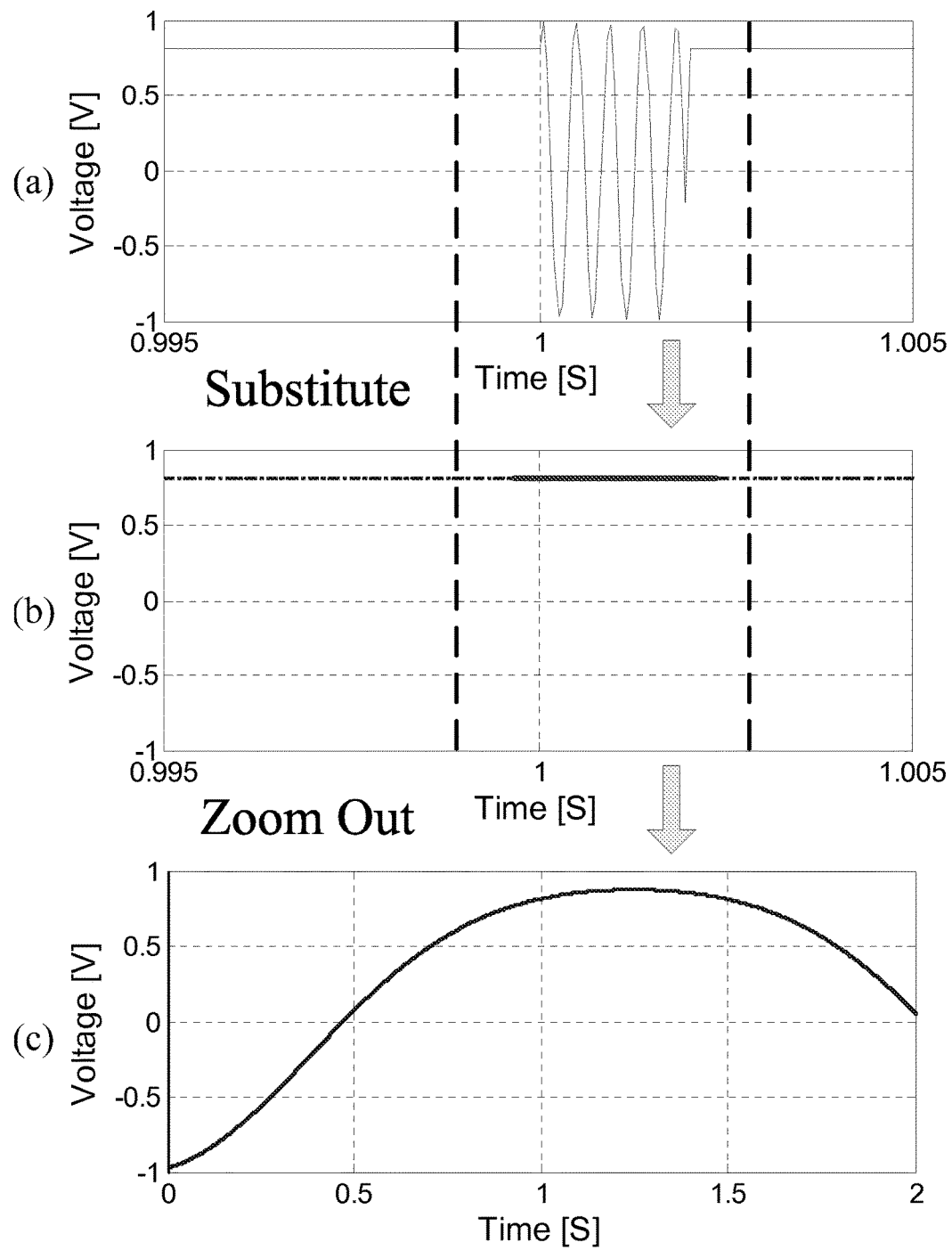
FIG. 3 depicts the procedure to recover interferometry signal. (a) Locate each beat signal period, (b) replace the beat signal with linear interpolation and (c) the rebuilt interferometry signal.

The periodicity of phase restricts formula (8) to a range of $[-\pi/2 \ \pi/2] \times (\lambda/4\pi)$. When displacement exceeds this range, a phase unwrapping procedure is necessary to rebuild the actual displacement. The phase unwrapping process is a memory algorithm. Hence the inserted beat signal cannot be simply ignored even though their duration time only occupies a very small portion of the entire transmitted waveform. Otherwise, the inserted beat signal will severely degrade the phase history. It has been previously taught that the beat signal eliminating procedure may be achieved by a high-order FIR filter. Satisfactory filtering is costly because it requires very high sampling rate as well as high filter order, and thus demanding a lengthy computing time. In the present invention, an alternative filter approach that is more robust and less resource consuming is implemented. Given that the positions of the beat signals can be easily determined, and the interferometry signal is almost flat within such short period, it is safe to replace the beat signal with linear interpolation without introducing significant distortion to the interferometry signal. The interferometry signal reconstruction procedure is depicted in FIG. 3. FIG. 3(c) is the rebuilt interferometry signal without FMCW bursts, which can be used for demodulation of the displacement information.

As mentioned above, angular information is obtained by steering the antenna beam. Combining the distance information and the angular information, a two dimensional polar coordinate can be constructed, which shows the top view of the location of objects in a room.

Unlike the optical sensors that can provide detailed information of each object and distinguish them through image processing, it is hard for pure FMCW radar to distinguish people from other objects just using the 2D top view. In this work, target recognition is realized by the coherent phase property of the chirp signals. In multiple objects circumstance, the beat signal can be represented as:

$$S_B(\tau) = \exp\left(f_b t + \frac{4\pi f_c R(\tau)}{c}\right) + \sum_{i=1}^{N} A_i \exp\left(f_{bi} t + \frac{4\pi f_c R_i}{c}\right) \quad (9)$$

where the first isolated term indicates the normalized beat signal of a moving target if there is any, and the second summation term indicates reflection from stationary clutters; $A_i$ is the relative signal amplitude of the $i_{th}$ clutter compared with that of the target. The transmitted FMCW signal in the present invention is designed to be coherent chirps, which means not only the frequencies but also the initial phases of the chirps are the same. This ensures the signals reflected by stationary clutters are identical from chirp to chirp. For the moving target, however, even if the beat frequencies remain the same, the phase information does not because of the phase change due to the target motion. Ideally, the difference between two beat signals is only related to the moving target:

$$S_B(\tau) - S_B(\tau + \Delta\tau) = \exp\left(f_b t + \frac{4\pi f_c R(\tau)}{c}\right) - \exp\left(f_b t + \frac{4\pi f_c R(\tau + \Delta)}{c}\right) \quad (10)$$

Because the FFT Operator is a Linear Operator:

$$FFT[S_B(\tau) - S_B(\tau+\Delta\tau)] = FFT[S_B(\tau)] - FFT[S_B(\tau+\Delta\tau)] \quad (11)$$

stationary clutters can also be removed in the subtracted spectrum between different beat signals.

Figure 4:
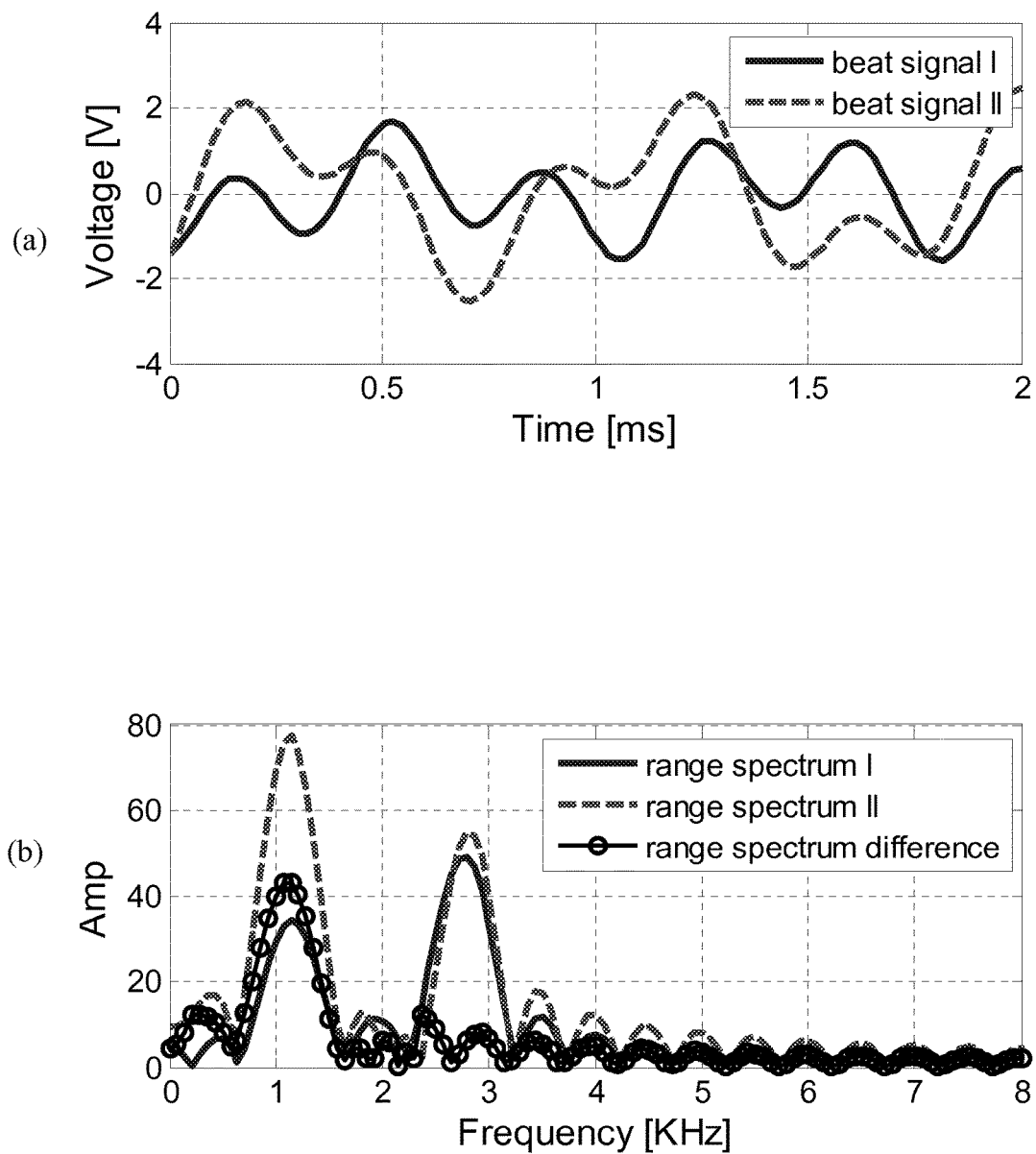
FIG. 4 depicts (a) Two different beat signals at different times, (b) the range spectra of the two beat signals and their difference.

FIG. 4 demonstrates the aforementioned clutter removal procedure. FIG. 4(a) shows two beat signals when detecting a stationary clutter and a moving target at two different times. The distances between the target and the clutter are 2 m and 5 m at the two different times, respectively. Their corresponding range spectra are plotted in FIG. 4(b). Obviously, peak A (target) has a much larger variation than peak B (stationary clutter) and the difference between the two range spectra only preserves the beat frequency corresponding to the moving target.

Micro-Doppler Detection for Motion Classification:

Human behavior is more than just respiration or heartbeat. The micro-Doppler has been reported as a signature to distinguish among various life activities and gestures, enabling a more comprehensive health care system and a wireless approach to human-computer interaction. Being sensitive to Doppler effect, interferometry is an ideal technique to monitor the micro-Doppler effect. Its capability in life activities recognition will be demonstrated in the present invention. First, the rebuilt interferometry I and Q signals shown in (6) and (7) are combined to obtain the complex signal. With a sliding window, short time FFT (STFFT) can be used to extract the micro-Doppler features.

Figure 5:
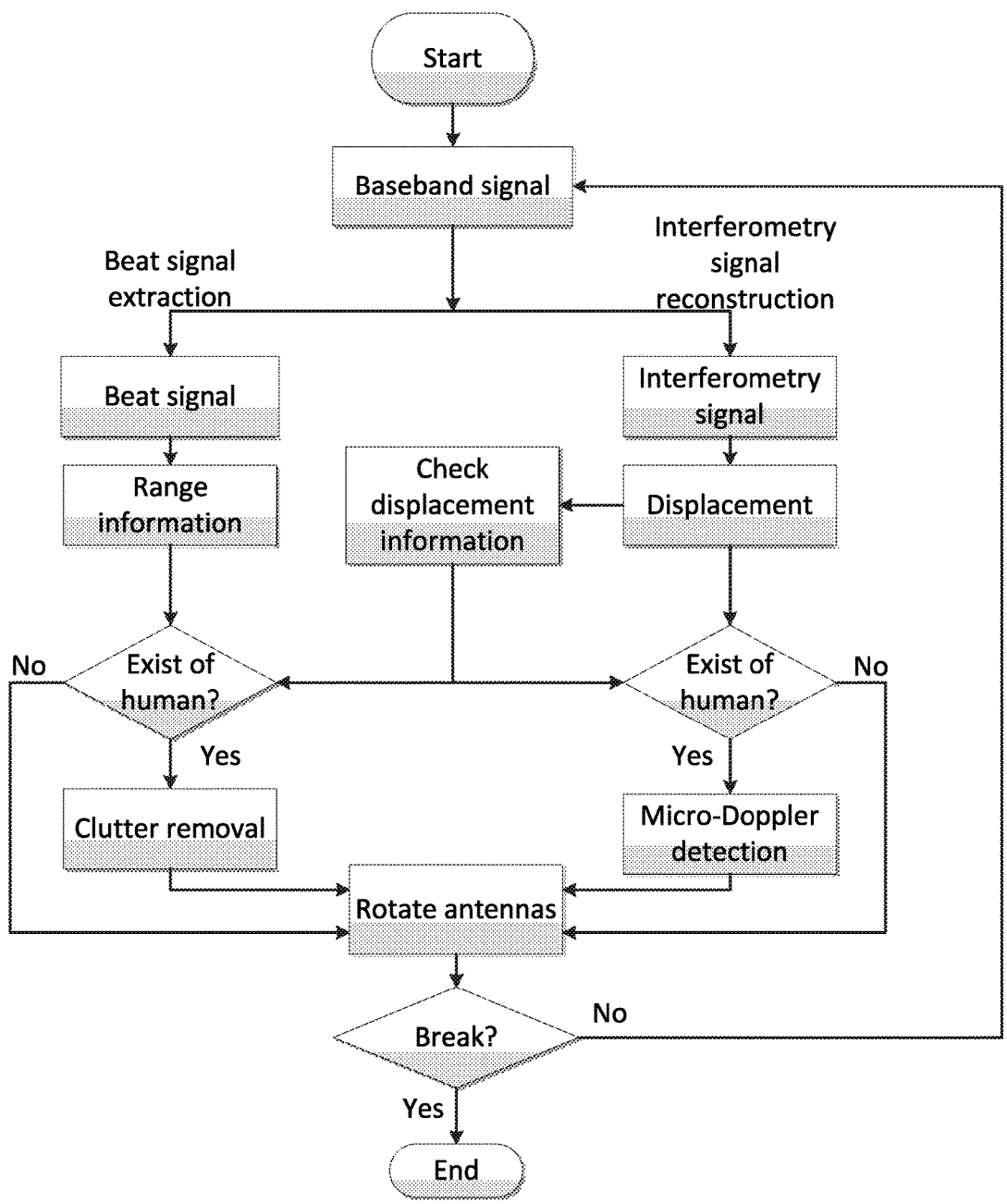
FIG. 5 depicts a baseband signal processing flow.

The complete signal processing flow is shown in FIG. 5. Range information and relative displacement are obtained simultaneously. Notice that the clutter removal algorithm is resource consuming and does not need to be performed at all times. To minimize the computation load, interferometry mode is employed at the first place to determine the angular direction of the human targets. Since interferometry mode is more sensitive to tiny movement, if no movement is detected by the interferometry mode at one angular bin, or spatial resolution bin, it is safe to assume all the objects in this direction are stationary clutters. In realistic applications to locate human beings, the FMCW mode and the clutter removal process will only be activated when the interferometry mode confirms the existence of moving target in that direction.

Figure 6:
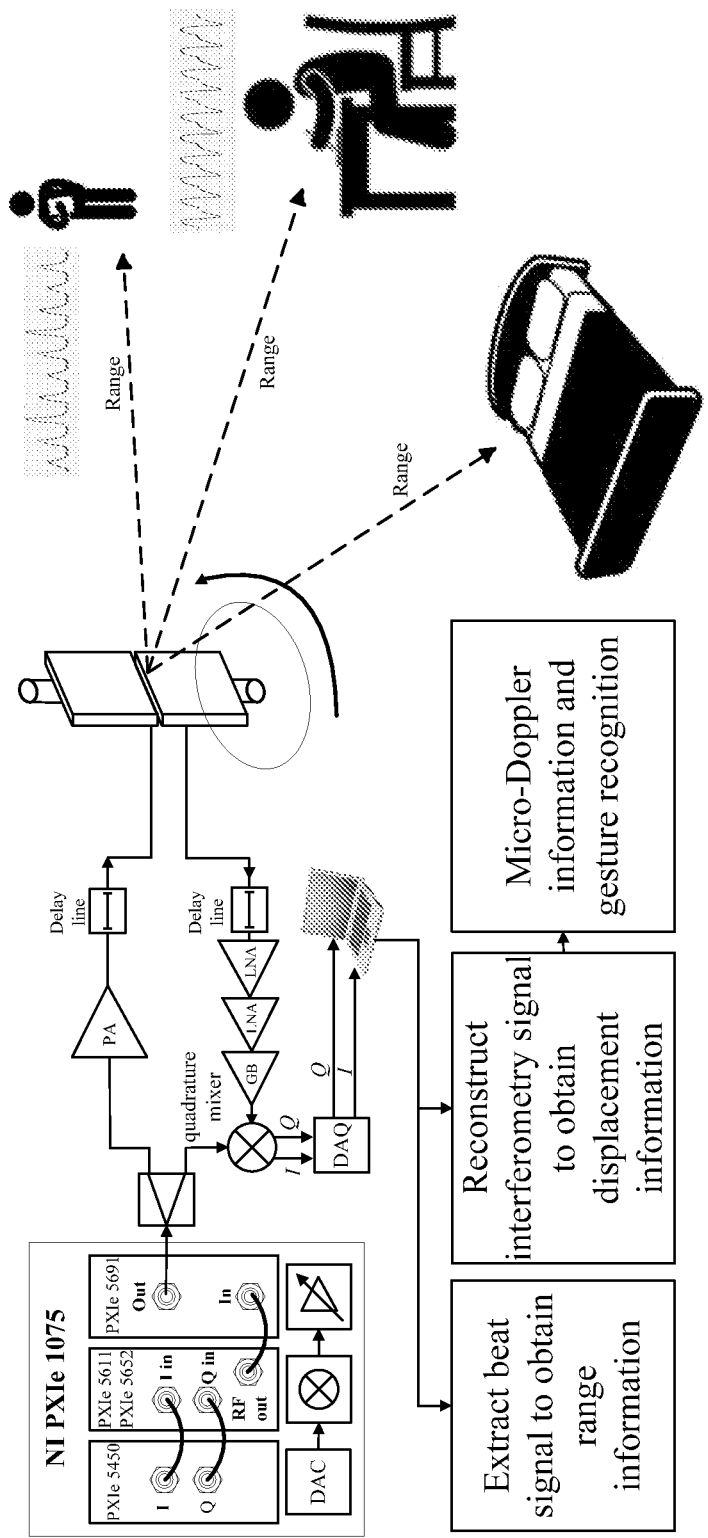
FIG. 6 depicts a block diagram of prototype radar system and experimental setup.

The simplified exemplary block diagram and experimental setup of the proposed hybrid radar system of the present invention is shown in FIG. 6. The radar system mainly contains three parts: the radar waveform generator, the microwave front end, and the baseband signal processing unit.

In an exemplary embodiment of the present invention, the transmitted signal is generated by a modular electronic instrumentation platform, such as a National Instruments PXIe 1075 chassis with three function blocks which follow the signal generation sequence: (i) the PXIe 5450 (programmable baseband vector signal generator that can precisely define both the frequency and phase for coherent FMCW signal), (ii) the PXIe 5611/PXIe 5652 (up-converter associated with local oscillator) and (iii) the PXIe 5691 (variable RF gain block). The final output of the PXIe chassis is a series of FMCW chirp signals embedded in a single tone CW signal. The linear frequency-modulated chirp signal of the exemplary embodiment sweeps from 5.72 GHz to 5.88 GHz with a duration time of 2 ms and a power level of 13 dBm. The interferometry signal has an operating frequency of 5.72 GHz.

Both the FMCW mode and the interferometry mode need a replica of the transmitted signal as the local oscillator to down convert the received signal to derive the beat frequency and Doppler information. The hardware similarity allows the two modes to share the same RF front end. The transmitted signal is split into two by a Wilkinson Power divider. One signal serves as the local oscillator and the other is fed into a power amplifier with 17 dB gain to compensate for the free space loss. On the receiver end, two LNAs followed by a gain block amplify the weak received signal with a total gain of 47.5 dB. The last stage of the RF front-end is a quadrature down-converter, where the received signal is mixed with a local copy of the transmitted signal. The I/Q outputs are digitized by an NI 9234 for digital signal processing. To minimize the coupling between the transmitter and the receiver, which is a serious problem for many CW radars, two antennas are employed although it increases the size of the RF front end. Both the TX and the RX antennas have a gain of 17 dBi in the horizontal plane (E plane) and 14 dBi in the vertical plane (H plane). Antennas can rotate mechanically in the horizontal plane, and the two antennas were vertically placed up and down to align their radiation beam, as shown in FIG. 6.

For indoor range detection, the objects are close to the radar. Therefore, the RTTOF and its corresponding beat frequencies are small. When the period of the beat signal is comparable to the FMCW duration time, spectrum leakage is severe so that it is hard to get the correct beat frequency. To alleviate this problem, two delay lines were inserted between the antennas and amplifiers at both the transmitter and the receiver sides to increase the delay time and consequently result in a higher beat frequency. Another benefit of boosting the beat frequency is to minimize the influence of flicker noise in the down-converter. The extra delay introduced by the delay lines and circuit elements is constant and can be easily calibrated as long as the circuit and transmit signal remain the same.

Example 1

In applying the system of the present invention to an exemplary embodiment, a set of experiments was carried out to evaluate the performance of the proposed hybrid radar system before the indoor 2D positioning and life activates monitoring experiments.

Figure 7:
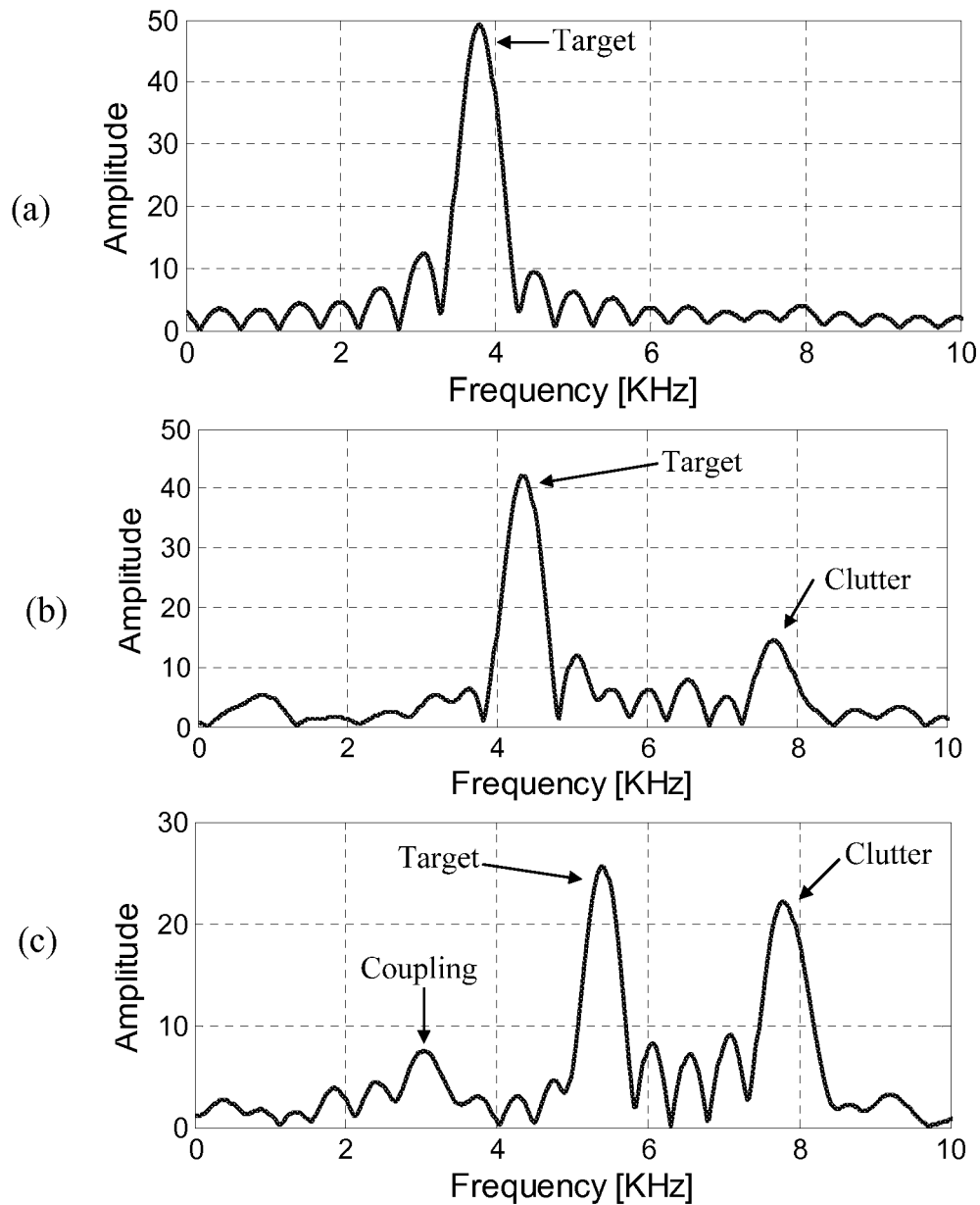
FIG. 7 depicts range spectra when the target is at 3 feet (a), 8 feet (b) and 13 feet (c) from the radar.

To evaluate the range detection performance, a cart carrying a piece of metal plate was moving along a ruler from 3 feet (91.44 cm) to 14 feet (426.72 cm) with a step size of 6 inch (15.24 cm). Calibration was performed when the target was 5 feet (152.40 cm) away from the antennas. The detected beat frequencies were compared with the calibration beat frequency and the difference in beat frequencies should be linearly proportional to the difference in range. FIG. 7 shows the normalized range spectra at 3 feet, 8 feet and 13 feet respectively. In the case of 3 feet distance, the TX-to-RX coupling and clutter are overwhelmed by the strong reflected signal from the target. The complete detected beat frequencies and the corresponding ranges at different locations are shown in Table I. Listed in the fourth column is the standard error from the reference distance measured by the ruler. The maximum error is less than 8 cm and the relative error is below 3%. The error is mainly due to the limited bandwidth and strong nearby clutter interference. The latter dominates when the target was far away from the radar. As the reflected signal strength decreases, the corresponding beat frequency fades and becomes vulnerable to nearby clutter, and may even be overwhelmed by the nearby clutters. The range accuracy is sufficient for most of indoor localization purposes. However it is still insufficient to detect tiny motion such as respiration or to recognize human gestures.

TABLE I

PERFORMANCE OF ABSOLUTE DISTANCE DETECTION

| Reference distance (Feet/cm) | Beat Freq. (Hz) | Measured distance (cm) | Standard error (cm) |
|---|---|---|---|
| 3.0/91.44 | 3793.5 | 84.84 | −6.60 |
| 3.5/106.68 | 3866.0 | 101.73 | −4.95 |
| 4.0/121.92 | 3914.3 | 120.68 | −1.24 |
| 4.5/137.16 | 4010.9 | 135.51 | −1.65 |
| 5.0/152.40 | 4083.4 | 152.40 | 0.00 |
| 5.5/167.64 | 4131.8 | 173.79 | 6.15 |
| 6.0/182.88 | 4228.4 | 186.11 | 3.23 |
| 6.5/198.12 | 4349.2 | 193.92 | −4.20 |
| 7.0/213.36 | 4397.5 | 215.35 | 1.99 |
| 7.5/228.60 | 4445.9 | 236.76 | 8.16 |
| 8.0/243.84 | 4566.7 | 244.59 | 0.75 |
| 8.5/259.08 | 4687.5 | 252.42 | −6.66 |
| 9.0/274.32 | 4711.0 | 270.07 | −4.25 |
| 9.5/289.56 | 4832.5 | 286.19 | −3.37 |
| 10.0/304.80 | 4880.8 | 307.61 | 2.81 |
| 10.5/320.04 | 4977.4 | 319.98 | −0.06 |
| 11.0/335.28 | 5026.6 | 341.25 | 5.97 |
| 11.5/350.52 | 5098.1 | 358.32 | 7.80 |
| 12.0/365.76 | 5195.7 | 370.49 | 4.73 |
| 12.5/382.00 | 5315.7 | 379.48 | −2.52 |
| 13.0/396.24 | 5412.4 | 390.82 | −5.42 |
| 13.5/411.48 | 5461.5 | 412.10 | 0.62 |
| 14.0/426.72 | 5509.9 | 433.32 | 6.60 |

Figure 8:
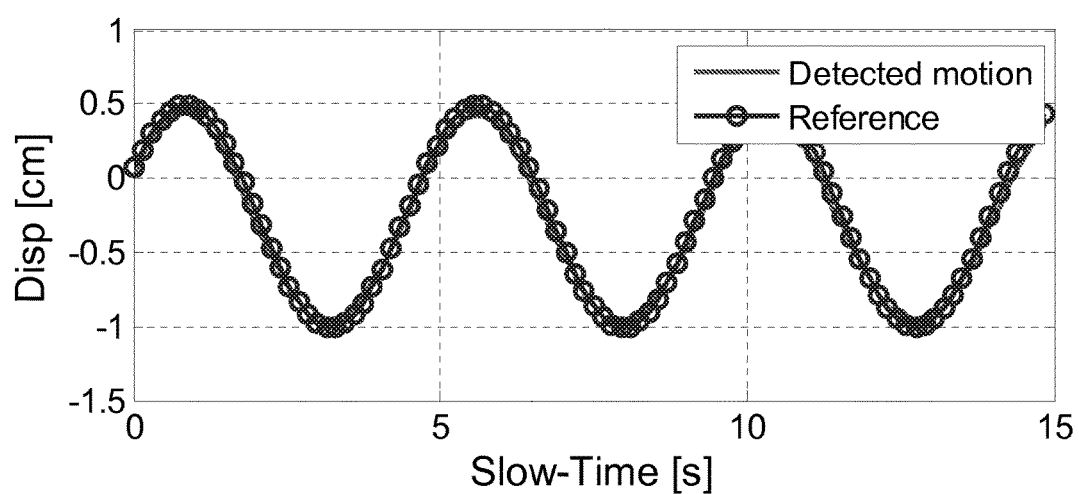
FIG. 8 depicts a comparison between the interferometry-detected displacement and actual motion.
Figure 9A:
FIG. 9 depicts (a) a panorama photo of the experiment environment for 2-D positioning and vital sign monitoring, (b) 2-D location map obtained by FMCW detection mode, (c) room layout and objects distribution in the room, (d) motion information detected by interferometry mode.
Figure 9B:
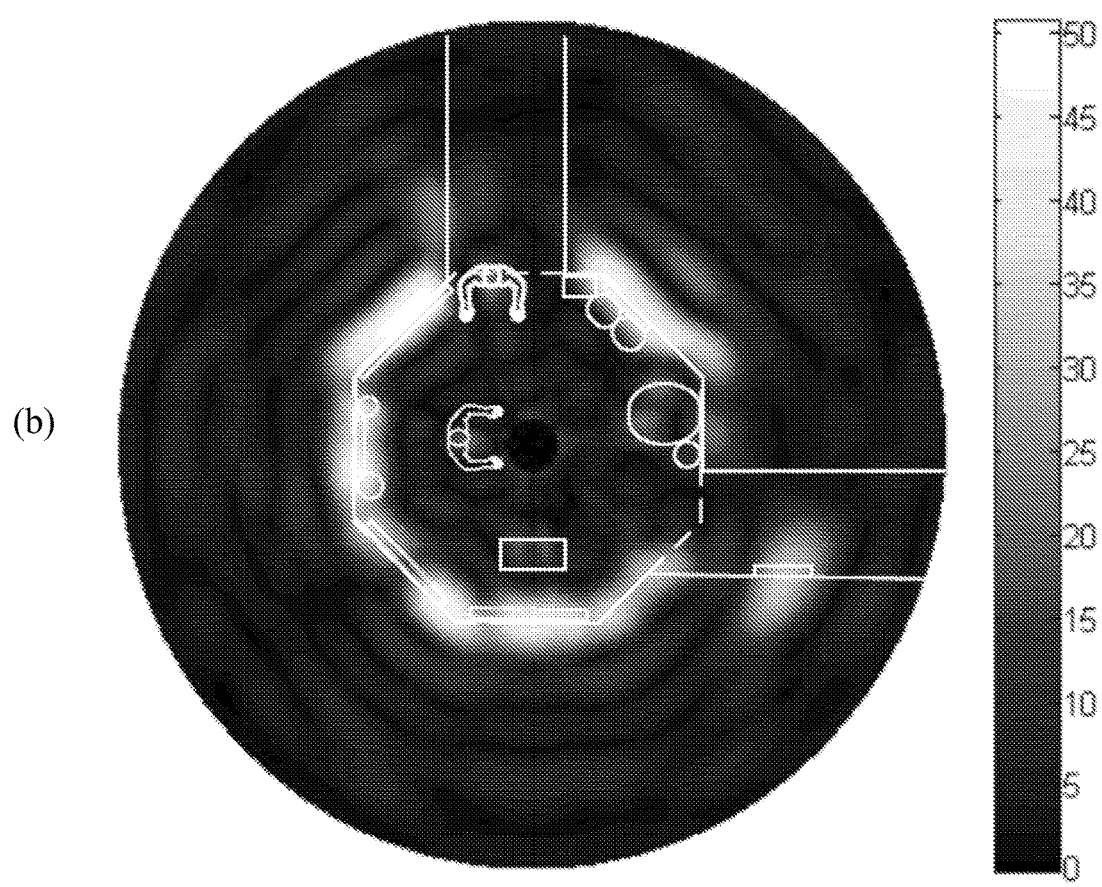
Figure 9C:
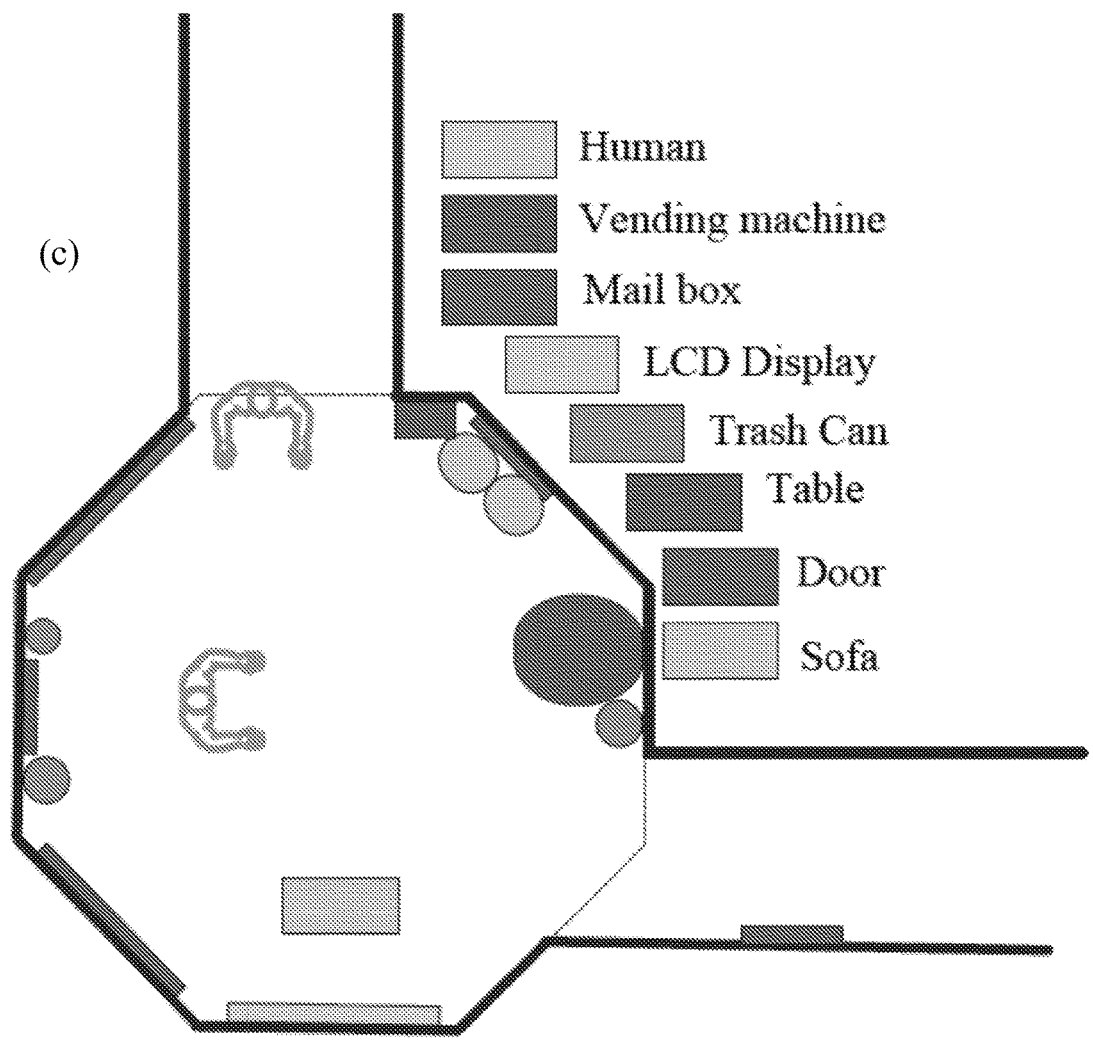
Figure 9D:
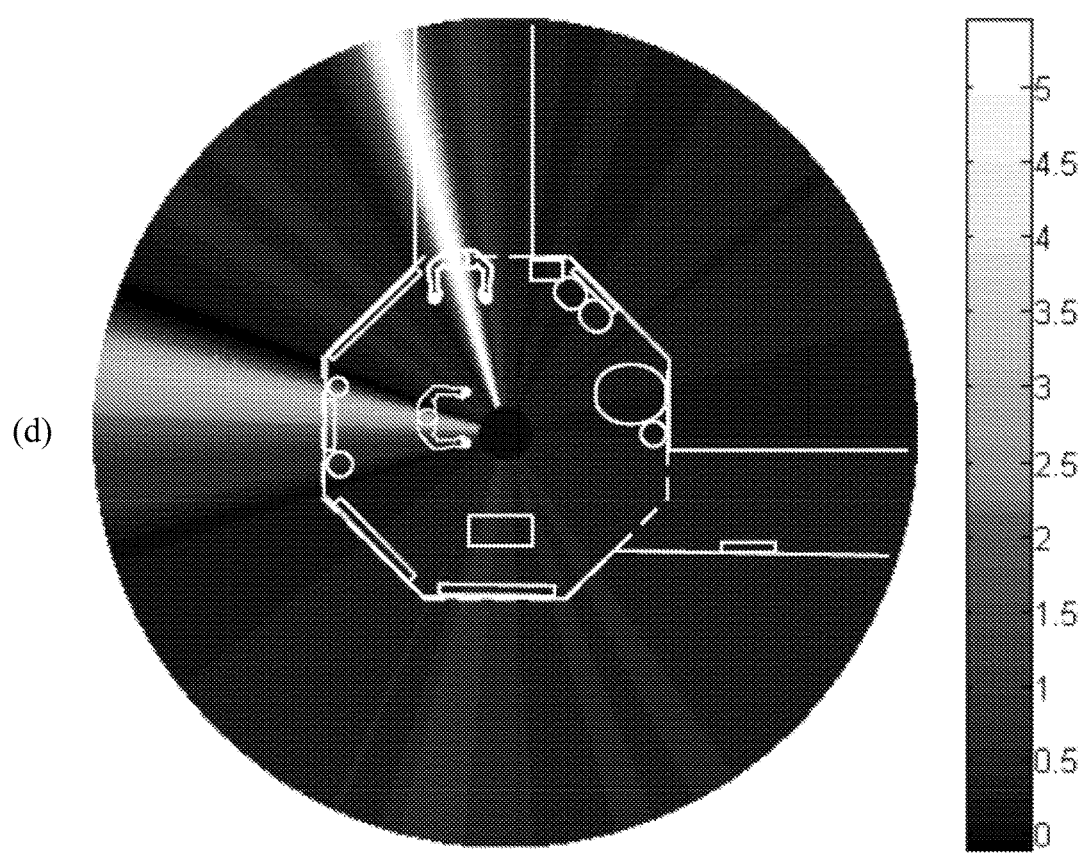

To evaluate the performance of the proposed radar system when monitoring small motions, a metal plate carried by a shaker that can provide programmable sinusoidal motion was employed as the target. During the experiment, the peak-to-peak amplitude and frequency of the shaker were set as 1.5 cm and 0.25 Hz respectively. The target was placed 50 inch in front of the radar. The plot in FIG. 8 is the comparison between the radar-detected movement and a reliable reference. The error is less than 1 mm, which is sufficient to tell the detailed information of human activities.

2D Location Mapping:

Next, the example transitions to real 2D location and life activities monitoring. The antenna pair was placed at the center of the room and rotated 360 degree with an angular step size of 5.625 degrees. The room has an octagon shape and is filled with several objects such as sofas, table, vending machine and trash can. Additionally, two people were sitting still and breathing normally in the room. FIG. 9(*a*) is a panorama photo depicting the experiment scene. FIG. 9(*b*) shows the detected and sketched top view of the objects distribution in the room. This map is plotted based on the beat signal alone. The outline of the room is plotted on the map, as well as two people sitting at locations corresponding to 11 o'clock and 9 o'clock directions. The strength of the reflected signal depends on the objects' radar cross section (RCS). The outlines of the room are walls made of strong reflecting materials including solid wood, bricks and metals. On the other hand, except for some wood frames, the sofas are mainly made of cloth that is a weak reflector. For the vending machine, the majority plastic cover is almost microwave transparent, so only its metal parts are shown on the map. Nevertheless, the good match in location illustrates that the radar shows a decent accuracy in finding the position of each object.

Figure 10:
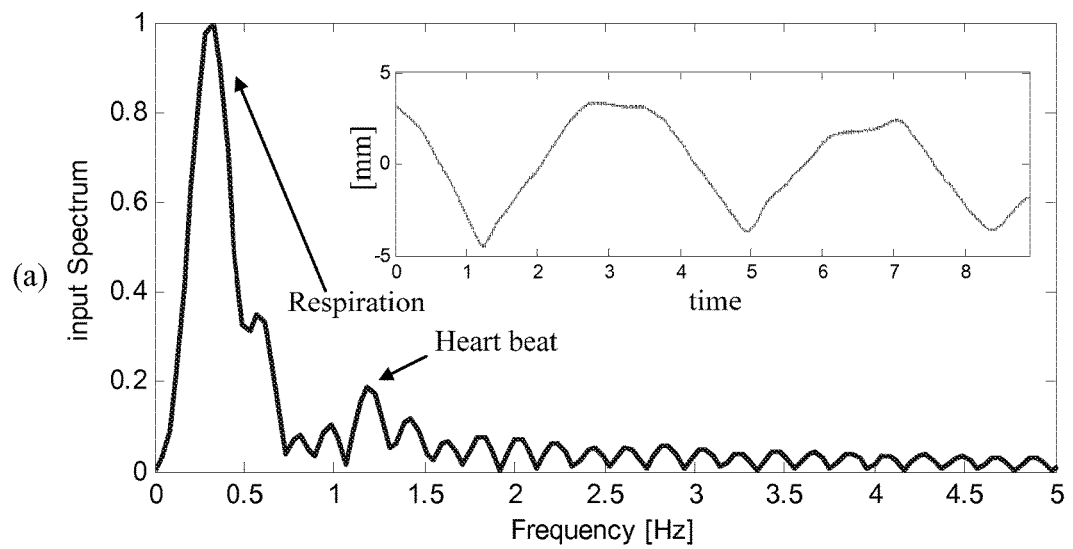
FIG. 10 depicts measured vital signs from the targets at a location corresponding to 9 o'clock (a) and at a location corresponding to 11 o'clock (b), respectively. The insets in FIGS. 10(a) and 10(b) are time domain waveforms.
Figure 10:
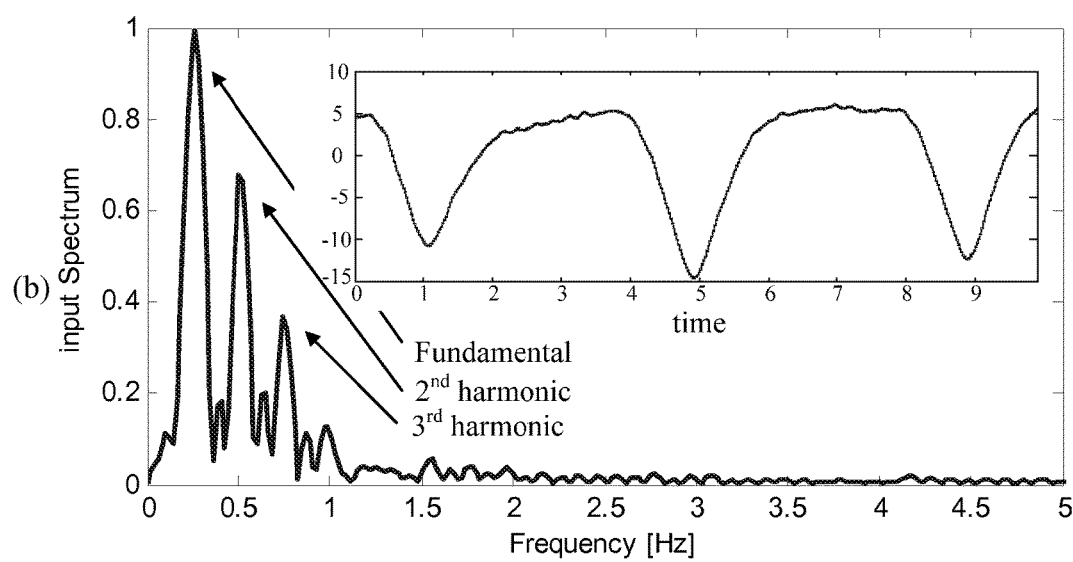

Vital Sign Monitoring:

At the same time, the rebuilt interferometry signal continuously monitors the movements in the current angular bin. FIG. 9(*c*) illustrates the angular distribution of motion intensity obtained by the interferometry mode. It should be noted that only the angular direction of targets with motions could be obtained because the interferometry mode is incapable of detecting range. FIG. 10 shows the detected displacements at the locations corresponding to 9 o'clock and 11 o'clock respectively. Clear and precise respiration patterns can be observed. The high sensitivity for respiration monitoring is desirable because it can reveal the health condition of the target subject being monitored. It is reported that people in different states of health or even in different emotion will show different respiration patterns. Therefore, it is beneficial to not only detect the physiological motion frequency, but also the motion pattern. For example, it has been reported that the movement of thoracic cavity during normal respiration is not restless but will stop a while after exhilaration. This phenomenon can be clearly observed in both results, especially in FIG. 10(*b*). According to Taylor expansion with Bessel coefficients, in the spectrum of the detected vital sign signal, higher order harmonics show up because of the sine/cosine phase modulation. When the target is close enough to the radar, it is even possible to monitor the heart beat as shown in FIG. 10(*a*).

Figure 11:
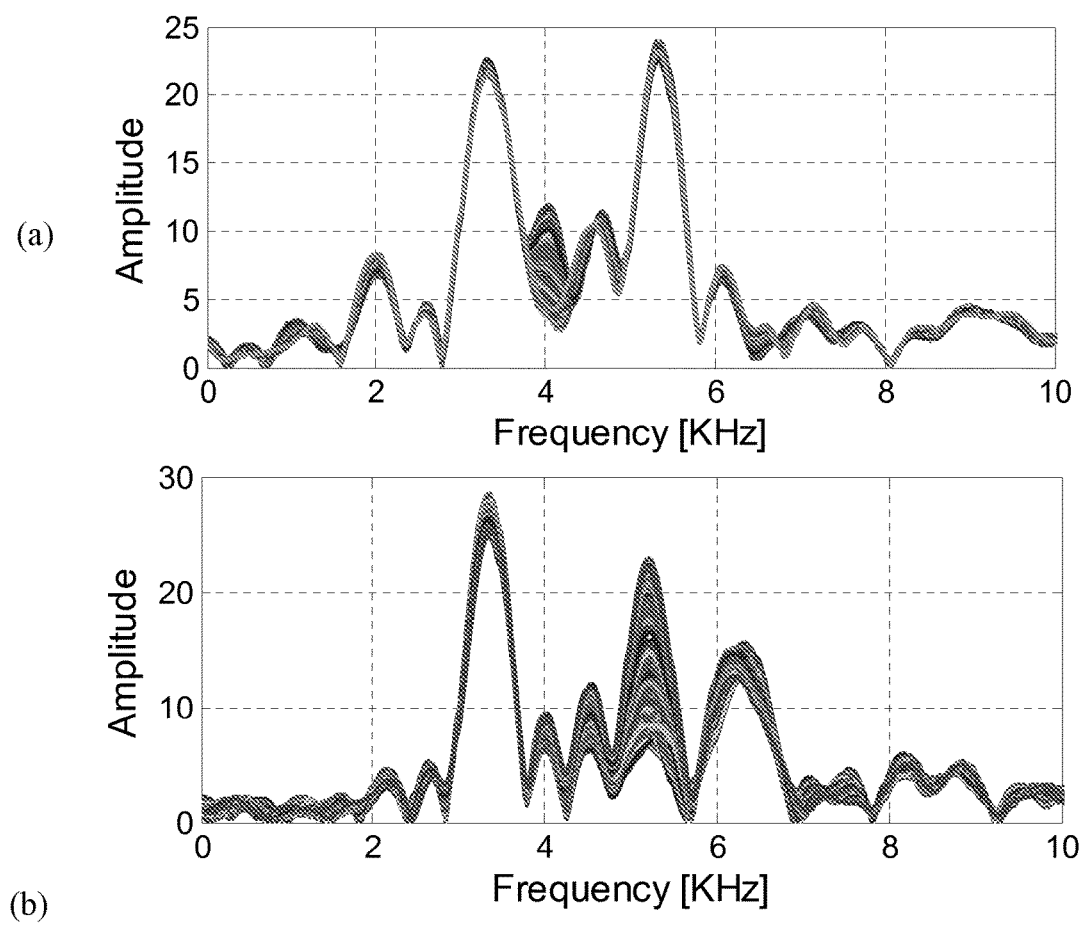
FIG. 11 depicts (a) Range spectra obtained from beat signals at a location corresponding to 9 o'clock. (b) Range spectra obtained from beat signals at a location corresponding to 11 o'clock.
Figure 12:
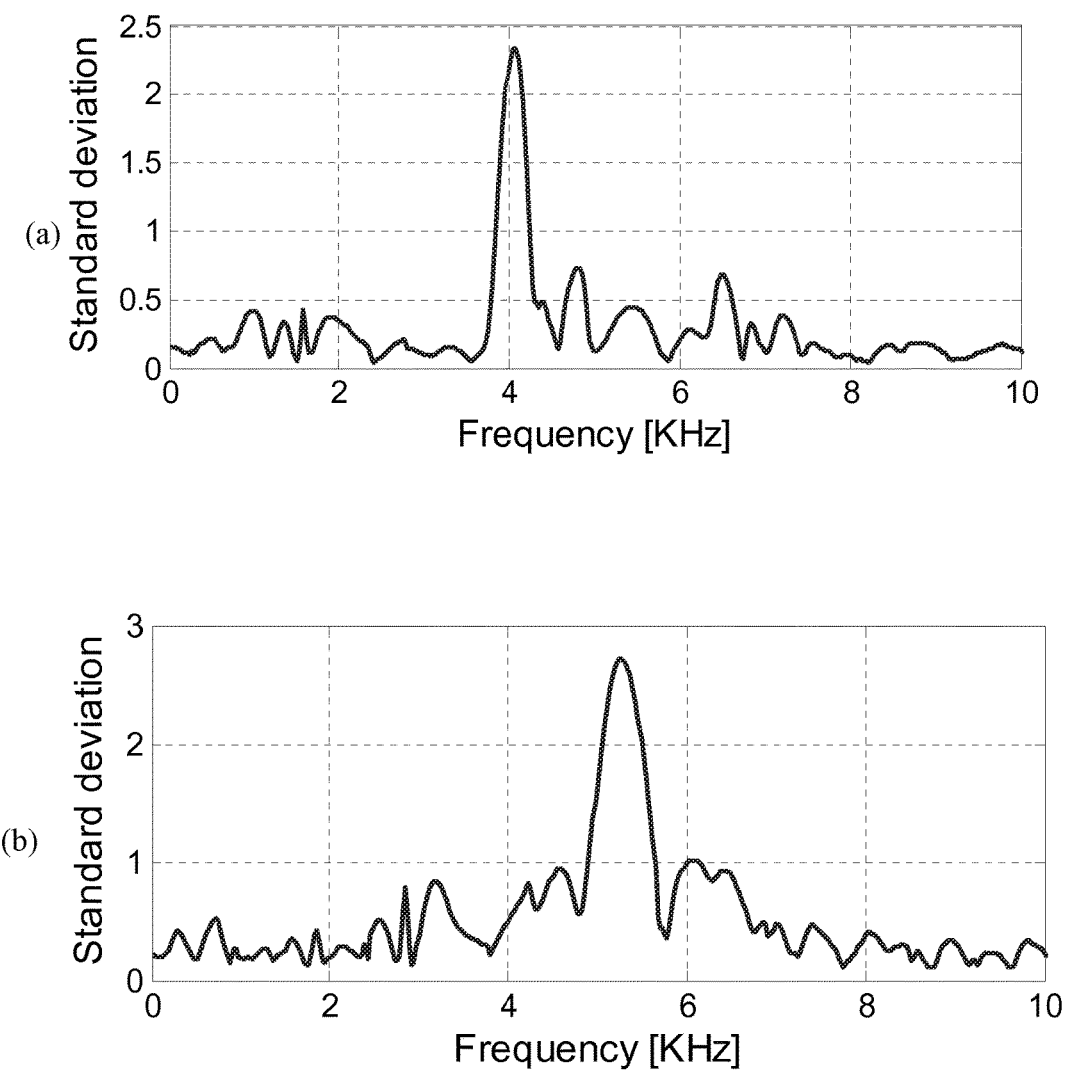
FIG. 12 depicts (a) standard deviation of the range spectra from beat signals at a location corresponding to 9 o'clock, (b) Standard deviation of the range spectra from beat signals at a location corresponding to 11 o'clock.
Figure 13:
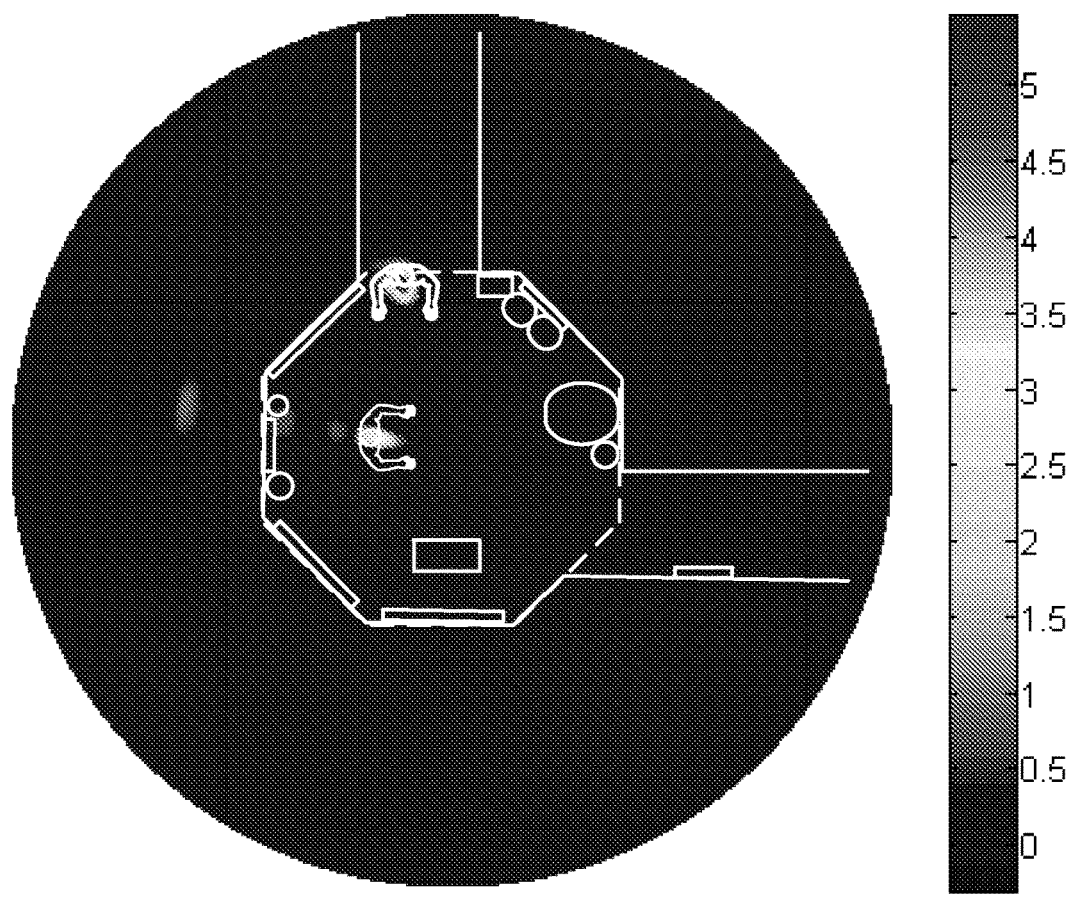
FIG. 13 depicts a 2-D map of human targets with stationary clutters removed.

Stationary Clutters Removal and Target Emphasis:

Stationary clutter removal should be achieved by the cooperation of interferometry mode and FMCW mode. The FMCW result in FIG. 9(*b*) is weighted in each angle based on the interferometry signal shown in FIG. 9(*d*). To minimize the computation load, the background comparison algorithm will only be activated when the amplitude of the motion detected by the interferometry mode exceeds a threshold. This occurred at the locations corresponding to 9 o'clock and 11 o'clock angle in FIG. 9(*d*). More often than not, the target is not the only object in a given angular bin. Just like the two targets in the experiment of FIG. 9, each human target coexists with other stationary clutters in a given angular bin. Ideally the background subtraction algorithm can eliminate the stationary clutters by taking the first beat signal as a reference and subtract it from the following beat signals in either frequency domain or time domain. However, this is risky because beat signals at two moments maybe similar consider the motion is periodic. Therefore, standard deviation of the range spectrum is used in real experiment to differentiate human and stationary target in the same angular direction. FIG. 11 shows the original range spectra of different beat signals. Obviously, the range bins where the moving targets are located have the largest variation in amplitude. FIG. 12 demonstrates the standard deviation at each range bin. A larger standard deviation represents a larger movement, which is caused by physiological motion of human subjects. Therefore, the locations with large standard deviations represent the location of human target. Finally, incorporate this algorithm into the previous 2D map results in a map of human location as illustrated in FIG. 13. The reason why the target at the location corresponding to 11 o'clock shows a larger RCS than that the location corresponding to 9 o'clock is because the target at the location corresponding to 11 o'clock had a larger respiration amplitude. It should be noted that this observation based on FMCW result agrees well with the respiration measurement result in FIG. 10, which was obtained by the interferometry mode.

Example 2

Micro-Doppler Gesture Recognition

Figure 14A:
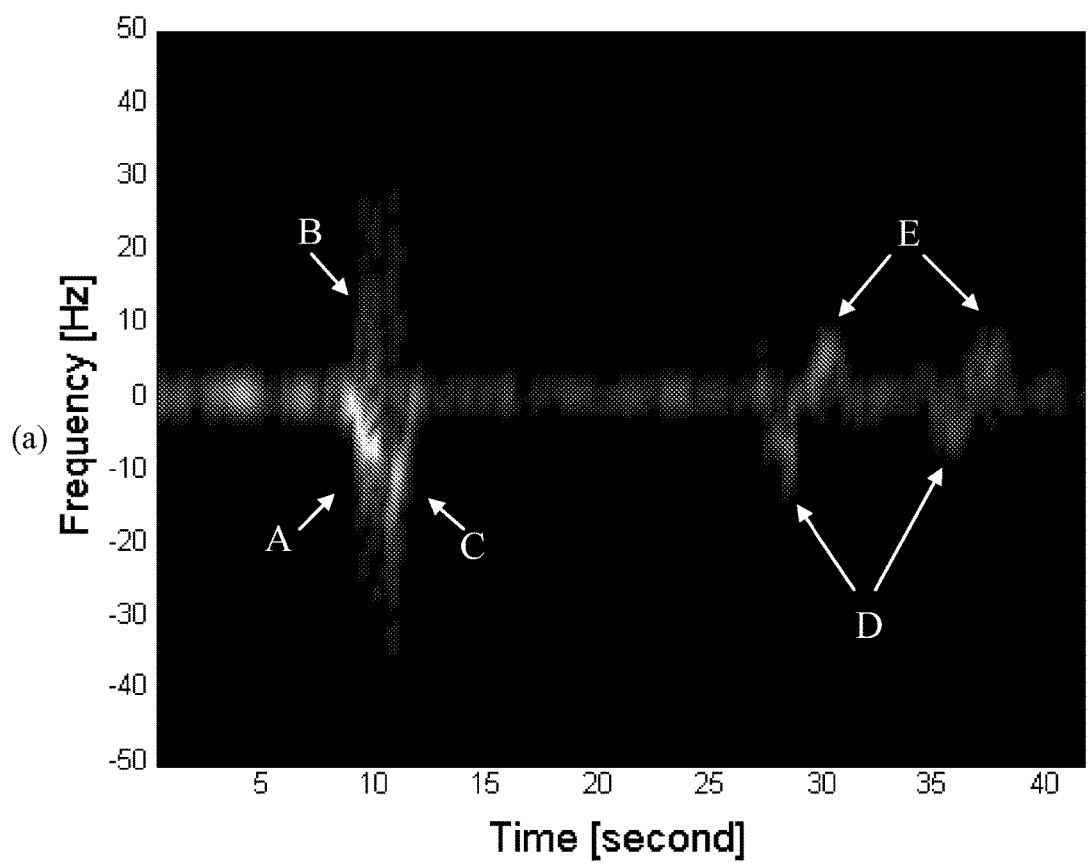
FIG. 14 depicts (a) Micro-Doppler signature of a person sitting down and waving hands twice. (b) Micro-Doppler signature of a walking person.
Figure 14B:
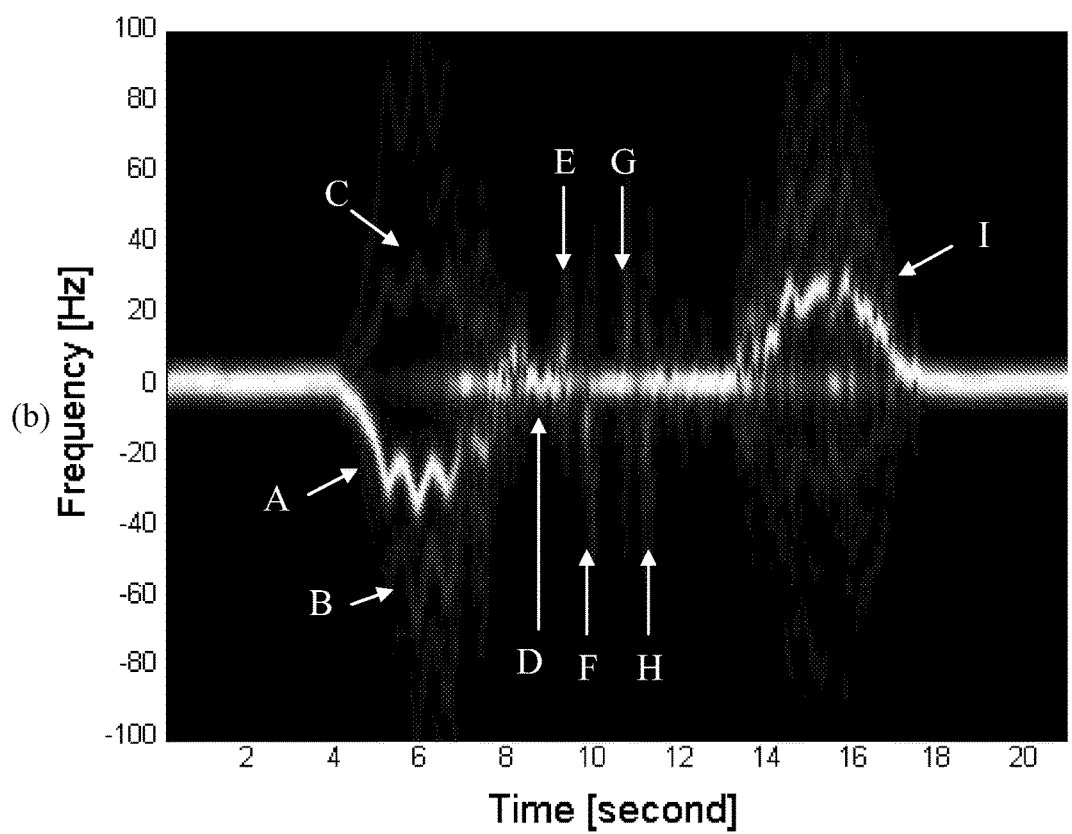

FIG. 14(*a*) depicts the micro-Doppler information of a series of motions performed by a person facing the radar system of the present invention. The subject changed from standing to sitting on a chair, and then waved his arm twice. When sitting down, most parts of the upper body moved backward, producing a large negative Doppler frequency component at A. Meanwhile, some other parts such as the head moved forward and created a positive frequency at B. When the bottom reaches the seat, the upper body approaches towards the seatback and creates another significant negative Doppler frequency at C. During the arm waving action, the subject lifted his arm from the armrest and laid it down immediately, with the elbow serving as the pivot. Correspondingly, on the spectrum there was a negative frequency (D) followed by a positive frequency (E). Between these actions, the target just sat still. FIG. 14(*b*) describes another series of motion of a subject who walked away from radar, turned around, pushed and pulled the arm twice and then walked towards radar. When walking away from radar, large negative Doppler frequency can be observed at A, and the ripple came from arms' and legs' swing. Different parts of arms and legs produce different time various Doppler frequencies (B and C). When the subject was turning around, both positive and negative frequency raised simultaneously yet with smaller values, (D) And it is straightforward that pushing arm produced positive Doppler frequency (E and G) and pulling it back produced negative ones (F and H). When the subject walked towards radar, the Doppler frequency pattern at I is close to a mirrored version at A. With an advanced pattern recognition algorithm, it is possible for computers to recognize certain behaviors and serve as a wireless user interface (UI).

The operative device of the present invention, according to some embodiments, may be implemented in various forms. For example, the device may include virtually any portable computing device capable of connecting to another device and receiving information. Such devices include multi-touch and portable devices such as, but not limited to, cellular phones, smart phones, display pagers, radio frequency (RF) devices, infrared (IR) devices, Personal Digital Assistants (PDAs), handheld computers, laptop computers, wearable computers, tablet computers, navigation devices, e-book terminals, integrated devices combining one or more of the preceding devices, and the like. Mobile devices also may include at least one client application that is configured to receive content from another computing device. The client application may include a capability to provide and receive textual content, graphical content, audio content, and the like. The client application may further provide information that identifies itself, including a type, capability, name, and the like. In one embodiment, the devices may uniquely identify themselves through any of a variety of mechanisms, including a phone number, Mobile Identification Number (MIN), an electronic serial number (ESN), or other device identifier.

The hybrid radar system of the present invention may communicate identification information via a wireless network. A Wireless network may include any of a variety of wireless sub-networks that may further overlay stand-alone ad-hoc networks, and the like, to provide an infrastructure-oriented connection for the system. Such sub-networks may include mesh networks, Wireless LAN (WLAN) networks, cellular networks, and the like. Wireless network connectivity for the system may further include an autonomous system of terminals, gateways, routers, and the like connected by wireless radio links, and the like. These connectors may be configured to move freely and randomly and organize themselves arbitrarily, such that the topology of the wireless network may change rapidly. The system may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for devices, such as the system of the present invention (as set forth in FIG. 6). For example, a wireless network may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, the radar system of the present invention may include virtually any wireless communication mechanism by which information may travel between the detection device and another computing device, network, and the like.

The system's communications embodiments, as a network, are enabled to employ any form of computer readable media for communicating information from one electronic device to another. For security of the information, such information may be secured by using a known or to be known negotiated encryption key or a pre-defined encryption key. Such encryption may occur at the detection device, a receiving computer, or some combination thereof. Within the communications networks utilized or understood to be applicable to the present invention, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Figure 15:
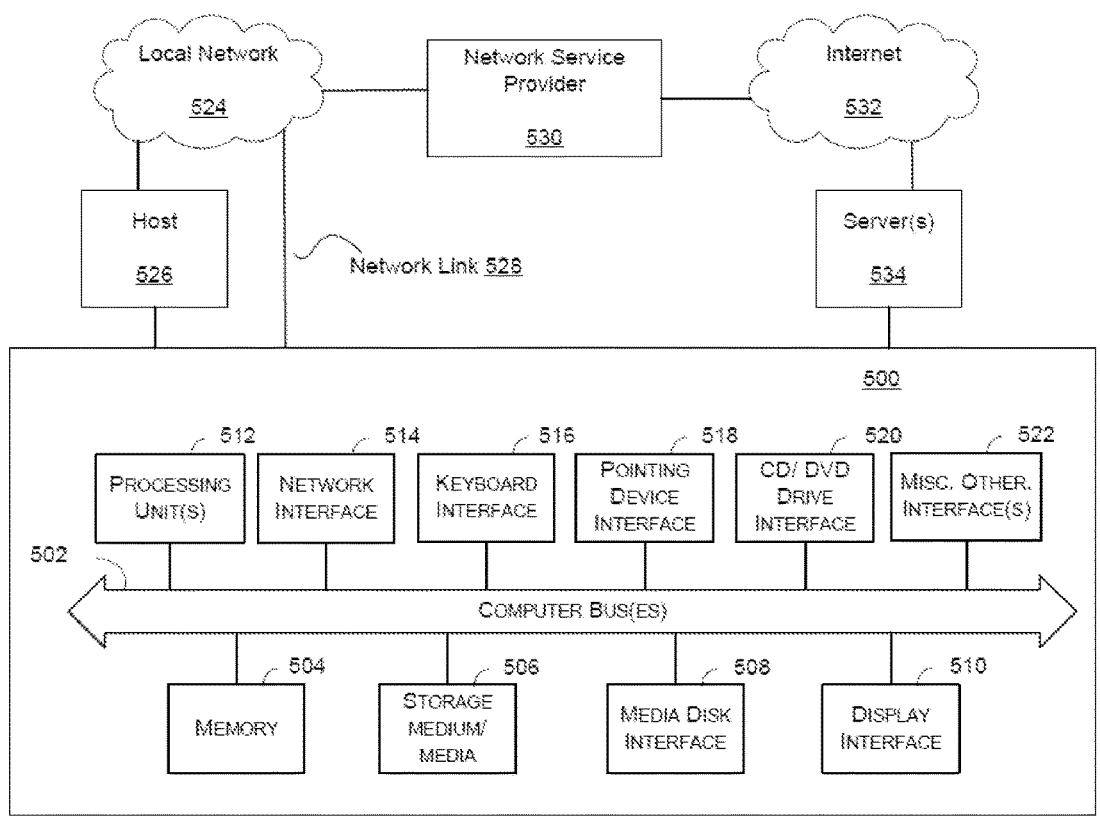
FIG. 15 is a block diagram illustrating architecture of a hardware device in accordance with one or more embodiments of the present invention.

FIG. 15 is a block diagram illustrating an internal architecture of a computing device, e.g., a computing device such as server or user computing device, in accordance with one or more embodiments of the present invention. FIG. 15 illustrates a computer system upon which some exemplary embodiments of the present invention may be implemented. Although computer system 500 is depicted with respect to a particular device or equipment, it is contemplated that other devices or equipment (e.g., network elements, servers, processors) within can deploy the illustrated hardware and components of system 500.

As shown in FIG. 15, internal architecture 500 includes one or more processing units, processors, or processing cores, (also referred to herein as CPUs) 512, which interface with at least one computer bus 502. Also interfacing with computer bus 502 are computer-readable medium, or media, 506, network interface 514, memory 504, e.g., random access memory (RAM), run-time transient memory, read only memory (ROM), media disk drive interface 520 as an interface for a drive that can read and/or write to media including removable media such as floppy, CD-ROM, DVD, media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces and a universal serial bus (USB) interface.

Memory 504 interfaces with computer bus 502 so as to provide information stored in memory 504 to CPU 512 during execution of software programs such as an operating system, application programs, device drivers, and software modules that comprise program code, and/or computer executable process steps, incorporating functionality described herein, e.g., one or more of process flows described herein. CPU 512 first loads computer executable process steps from storage, e.g., memory 504, computer readable storage medium/media 506, removable media drive, and/or other storage device. CPU 512 can then execute the stored process steps in order to execute the loaded computer-executable process steps. Stored data, e.g., data stored by a storage device, can be accessed by CPU 512 during the execution of computer-executable process steps.

Persistent storage, e.g., medium/media 506, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present invention, e.g., listing selection module(s), targeting information collection module(s), and listing notification module(s), the functionality and use of which in the implementation of the present invention are discussed in detail herein.

Network link 528 typically provides information communication using transmission media through one or more networks to other devices that use or process the information. For example, network link 528 may provide a connection through local network 524 to a host computer 526 or to equipment operated by a Network or Internet Service Provider (ISP) 530. ISP equipment in turn provides data communication services through the public, worldwide packet-switching communication network of networks now commonly referred to as the Internet 532.

A computer called a server host 534 connected to the Internet 532 hosts a process that provides a service in response to information received over the Internet 532. For example, server host 534 hosts a process that provides information representing video data for presentation at display 510. It is contemplated that the components of system 500 can be deployed in various configurations within other computer systems, e.g., host and server.

At least some embodiments of the present invention are related to the use of computer system 500 for implementing some or all of the techniques described herein. According to one embodiment, those techniques are performed by computer system 500 in response to processing unit 512 executing one or more sequences of one or more processor instructions contained in memory 504. Such instructions, also called computer instructions, software and program code, may be read into memory 504 from another computer-readable medium 506 such as storage device or network link. Execution of the sequences of instructions contained in memory 504 causes processing unit 512 to perform one or more of the method steps described herein. In alternative embodiments, hardware, such as ASIC, may be used in place of or in combination with software. Thus, embodiments of the present invention are not limited to any specific combination of hardware and software, unless otherwise explicitly stated herein.

The signals transmitted over network link and other networks through communications interface, carry information to and from computer system 500. Computer system 500 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 502 as it is received, or may be stored in memory 504 or in storage device or other non-volatile storage for later execution, or both.

For the purposes of the present invention a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of the present invention the term "user", "subscriber" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

For the purposes of the present invention the term Time-division (TD) system is a multiplexing system of transmitting and receiving independent signals over a common signal path by means of synchronized switches at each end of the transmission line so that each signal appears on the line only a fraction of time in an alternating pattern. By utilizing a TD system that switches the system of the present invention between the FMCW mode and interferometry mode, a series of signaling occurs, having both the FMCW baseband signal and the interferometry baseband signal.

Those skilled in the art will recognize that the methods and systems of the present invention may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in the present invention are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of the present invention, such embodiments should not be deemed to limit the teaching of the present invention to those embodiments. Various changes and modifications may be made to the elements and operations described above to obtain a result that remains within the scope of the systems and processes described in the present invention.

REFERENCES

[1] C. Li, V. M. Lubecke, O. Boric-Lubecke, and J. Lin, "A review on recent advances in Doppler radar sensors for noncontact healthcare monitoring," IEEE Trans. Microw. Theory Tech., vol. 61, no. 5, pp. 2046-2060, May 2013.

[2] B. Schleicher, I. Nar, A. Trasser, and H. Schumacher, "IR-UWB radar demonstrator for ultra-fine movement detection and vital-sign monitoring," *IEEE Trans. Microw. Theory Tech.*, vol. 61, no. 5, pp. 2076-2085, May 2013.

[3] F. Wang, T. Horng, K. Peng, H. Jau, J. Li and C. Chen, "Detection of concealed individuals based on their vital signs by using a see-through-wall imaging system with a self-injection-locked radar," *IEEE Trans. Microw. Theory Tech.*, vol. 61, issue 1 part 2, pp. 696-704. 2013.

[4] C. Gu, R. Li, H. Zhang, A. Y. C. Fung, C. Torres, S. B. Jiang, C. Li, "Accurate respiration measurement using DC-coupling continuous-wave radar sensor for motion-adaptive cancer radiotherapy", *IEEE Trans. Biomedical Engineering*, vol. 59, no. 11, pp 3117-3123, November 2012.

[5] F.-K. Wang, C.-J. Li, C.-H. Hsiao, T.-S. Horng, J. Lin, K.-C. Peng, J.-K. Jau, J.-Y. Li, and C.-C. Chen, "Seeing through walls with a self-injection-locked radar to detect hidden people," in *IEEE MTT-S Int. Mircow Symp. Dig.*, Montreal, QC, Canada, June 2012, pp. 1-3, Sec. THPE-4.

[6] Y. Wang, Q. Liu, A. E. Fathy, "CW and pulse-Doppler radar processing based on FPGA for human sensing applications," *IEEE Trans. Geoscience and Remote Sensing*, vol. 51, issue 5, pp. 3097-3107, 2013.

[7] Y. Kim and H. Ling, "Through-wall human tracking with multiple Doppler sensors using an artificial neurual network," *IEEE Trans. Antennas. and Propagation*, vol. 57, issue 7, pp. 2116-2122, 2009.

[8] M. T. Ghasr, S. Kharkovsky, R. Bohnert, B. Hirst and R. Zoughi, "30 GHz linear high-resolution and rapid millimeter wave imaging system for NDE," *IEEE Trans. Ant. and Propagation*, vol. 61, no. 9, pp. 4733-4740, September 2013.

[9] C. Li, X. Yu, C. M. Lee, D. Li, L. Ran, and J. Lin, "High-sensitivity software-configurable 5.8-GHz radar sensor receiver chip in 0.13-μm CMOS for noncontact vital sign detection," *IEEE Trans. Microw. Theory Tech.*, vol. 58, no. 5, pp. 1410-1319, May 2010.

[10] A. D. Droitcour, O. Boric-Lubecke, V. M. Lubecke, and J. Lin, "0.25-μm CMOS and BiCMOS single-chip direct-conversion Doppler radars for remote sensing of vital signs," in *Proc. 2002 IEEE International Solid-State Circuits Conference*, San Francisco, Calif., USA, February 2002, vol. 1, pp. 348-349.

[11] C. Gu, G. Wang, Y. Li, T. Inoue, and C. Li, "A hybrid radar-camera sensing system with phase compensation for random body movement cancellation in Doppler vital sign detection", *IEEE Trans. Microw. Theory and Tech.*, vol. 61, no. 12, pp. 4678-4688, December 2013.

[12] J. C. Y. Lai, Y. Xu, E. Gunawan, E. C. Chua, A. Maskooki, Y. L. Guan, K. S. Low, C. B. Soh, and C. L. Poh, "Wireless sensing of human respiratory parameters by low-power ultrawideband impulse radio radar," *IEEE Trans. Instrum. Meas.*, vol. 60, no. 3, pp. 928-938, March 2011.

[13] D. Zito, D. Pepe, M. Mincica, F. Zito, A. Tognetti, A. Lanata and D. D. Rossi, "SoC CMOS UWB pulse radar sensor for contactless respiratory rate monitoring", IEEE Trans. Biomedical Circuit and systems, vol. 5, issue 6, pp. 503-510, 2011.

[14] A. Nezirovic, S. Tesfay, A. S. E. Valavan, and A. Yarovoy, "Experimental study on human breathing cross section using UWB impulse radar," in *Proc. 2008 European Radar Conference*, Amsterdam, The Netherlands, October 2008, pp. 1-4.

[15] T. Mitomo, N. Ono, H. Hoshino, Y. Yoshihara, O. Watanabe and I. Seto, "A 77 GHz 90 nm CMOS Transceiver for FMCW radar applications". *IEEE Journal of Solid-State Circuits*, vol. 45, no. 4, April, 2010.

[16] S. Scheiblhofer, S. Schuster, A. Stelzer, "High-speed FMCW radar frequency synthesizer with DDS based linearization," *IEEE, Microwave and Wireless Components Letter*, vol. 17, issue 5, pp. 397-399, 2007.

[17] N. Pohl, T. Jaeschke, K. Aufinger, "An ultra-wideband 80 GHz FMCW radar system using a SiGe Bipolar Transceiver chip stabilized by a fractional-N PLL synthesizer," *IEEE Trans., Microw. Theory Tech.*, vol. 60, issue 3, part 2, pp. 757-765, 2012.

[18] J. D. Park and W. J. Kim, "An efficient method of eliminating the range ambiguity for a low-cost FMCW radar using VCO tuning characteristics," *IEEE Trans. Theory Tech.* vol. 54, no. 10, pp. 3623-3629, October 2006.

[19] T. Musch, "A high precision 24-GHz FMCW radar based on a fractional-N Ramp-PLL," *IEEE Trans. Instr. and Meas.*, vol. 52, no. 2, pp. 324-327, April, 2003.

[20] M. Mercuri, P. J. Soh, G. Pandey, P. Karsmakers, G. A. E. Vandenbosch, P. Leroux, D. Schreurs, "Analysis of an indoor biomedical radar-based system for health monitoring," *IEEE Trans., Microw. Theory Tech.*, vol. 61, issue 5, part 2, pp. 2061-2068. 2013.

[21] G. Wang, C. Gu, T. Inoue, and C. Li, "Hybrid FMCW-interferometry radar system in the 5.8 GHz ISM band for indoor precise position and motion detection", in *Proc 2013 IEEE MTT-S International Microwave Symposium*, Seattle, Wash., USA, June, 2013, pp. 1-3.

[22] G. Wang, J. M. Munoz-Ferreras, C. Gu, C. Li, and R. Gomez-Garcia, "Linear-frequency-modulated continuous-wave radar for vital-sign monitoring," in *Proc 2014 IEEE Topical Conference on Biomedical Wireless Technologies, Networks and Sensing Systems*, Newport Beach, Calif., USA, January, 2014, pp. 1-3.

[23] Y. Li, G. Wang, C. Gu and C. Li, "Movement-immune respiration monitoring using automatic DC-correction algorithm for CW Doppler radar system," *IEEE topical conference on Bio-medical wireless tech., networks and sensing systems (BioWireless)*, Newport Beach, Calif., January 2014.

[24] C. Li, Y. Xiao, J. Lin, "Experiment and Spectral Analysis of a Low-Power Ka-Band Heartbeat Detector Measuring from Four Sides of a Human Body," *IEEE Trans. Microwave Theory & Tech*, vol. 54, no. 12, pp. 4464-4471, December 2006.

[25] C. Gu T. Inoue, and C. Li, "Analysis and Experiment on the Modulation Sensitivity of Doppler Radar Vibration Measurement," *IEEE Microwave and Wireless Components Letters*, vol. 23, No. 10, pp. 566-568, October 2013.

What is claimed is:

1. A method for object localization and monitoring, comprising the steps of:
    transmitting, via a transmitting antenna coupled to a computing device, a first signal comprising frequency modulated continuous wave (FMCW) signal;
    transmitting, via the transmitting antenna and concurrent with the transmission of said first signal, a second signal, said second signal comprising a single-tone interferometry signal;
    receiving, via a receiving antenna coupled to the computing device, a third signal comprising an FMCW signal, wherein the third signal comprises a reflection of the first signal;

receiving, via the receiving antenna, a fourth signal comprising a single-tone interferometry signal, wherein the fourth signal comprises a reflection of the second signal;

determining, via the computing device, signal information associated with the third and fourth signals;

calculating, via the computing device, range and displacement information respective to the computing device based on said signal information; and visibly displaying, on a display associated with said computing device, range, displacement and gesture recognition based on the calculated range and displacement information.

2. The method of claim 1, wherein said first and second signals comprise a sequence of signals transmitted via a time division multiplexed transmitter.

3. The method of claim 1, wherein said first and said third signals comprise a chirped beat signal comprising an up-ramp linear frequency-modulated signal.

4. The method of claim 1, wherein said second and fourth signals comprise an interferometry signal having a fixed operating frequency.

5. The method of claim 1, wherein the receiving of said third signal and said fourth signal alternate.

6. The method of claim 1, wherein determining signal information further comprises extracting an integral beat signal and reconstructing the interferometry signal, which are used to provide range information and displacement information respectively.

7. The method of claim 6, wherein extracting the integral beat signal further comprises mixing a replica of the transmitted first signal with the received third signal.

8. The method of claim 7, wherein said mixing results in said integral beat signal represented by variable $S_b(t)$ in equation:

$$S_b(t) = S_{T(t)} \times S_R^*(t)$$
$$= \sigma \exp(j(f_b t + p_b + \varphi))$$

wherein $f_b$ is the beat frequency that is proportional to the distance information, wherein $p_b$ is the slow-time phase history, wherein $\varphi$ is the residual phase, wherein $S_R^*(t)$ is obtained in equation:

$$S_R(t) = \sigma S_T\left(t - \frac{2R(\tau)}{c}\right)$$

wherein $\sigma$ is the amplitude of the received signal normalized to the transmitted signal, and wherein $S_{T(t)}$ is the transmitted complex signal for one chirp period, wherein $R(\tau)$ is a distance between a point-scatterer and the receiving antenna, wherein t is the so-called fast-time.

9. The method of claim 1, wherein a waveform of said first signal is designed to be phase coherent.

10. The method of claim 7, wherein said extracting further comprises predicting following beat signals based on a FMCW burst interval.

11. The method of claim 6, wherein said determining signal information further comprises calculating the interferometry signal of a point-scatterer in baseband I/Q using arctangent demodulation.

12. The method of claim 11, wherein said calculating the interferometry signal further comprises utilizing said interferometry signal information to solve for variables $B_Q(\tau)$ and $B_I(\tau)$ for said interferometry signal in equations:

$$B_Q(\tau) = \cos\left[\frac{4\pi r(\tau)}{\lambda} + \theta + \Delta\phi(\tau)\right] + DC_Q$$

$$B_I(\tau) = \sin\left[\frac{4\pi r(\tau)}{\lambda} + \theta + \Delta\phi(\tau)\right] + DC_I.$$

wherein $\lambda = c/f_c$ is the wavelength of the RF carrier, wherein $r(\tau)$ is the displacement of the target in slow-time domain, wherein $\theta$ is a constant residual phase related to the initial distance of the target, wherein $\Delta\phi(\tau)$ is the circuit phase noise, and wherein $DC_I$ and $DC_Q$ are the DC levels of the I/Q channels, respectively.

13. The method of claim 12, further comprising eliminating the integral beat signal by determining said integral beat signal and replacing said integral beat signal with linear interpolation without introducing significant distortion to the interferometry signal.

14. The method of claim 1, further comprising:
determining angular information of a room by steering an antennae beam defined by the transmitting antenna,
combining said angular information and said range and displacement information,
calculating a two-dimensional polar coordinate; and
displaying said two-dimensional polar coordinate as a top view of the objects in a room on the display associated with said computing device.

15. The method of claim 1, further comprising monitoring micro-Doppler effects of an object using said interferometry signal.

16. The method of claim 15, wherein said micro-Doppler effects comprise physiological motion monitoring, gestures and other minor discrete movements.

17. The method of claim 1, further comprising localization and monitoring of multiple objects in a room.

18. The method of claim 17, wherein said multiple objects comprise living organisms.

19. The method of claim 18, wherein said multiple objects comprise humans.

20. The method of claim 17, wherein said localization of multiple objects differentiates between living organisms and stationary objects (clutters) in a room.

21. A non-transitory computer-readable storage medium tangibly encoded with computer-executable instructions, that when executed by a processor associated with a computing device, performs a method of object localization and monitoring, comprising:

transmitting, by way of a transmitting antenna coupled to the computing device, a first signal comprising frequency modulated continuous wave (FMCW) signal;

transmitting, by way of the transmitting antenna and concurrent with the transmission of said first signal, a second signal, said second signal comprising a single-tone interferometry signal;

receiving, by way of a receiving antenna coupled to the computing device, a third signal comprising an FMCW signal, wherein the third signal comprises a reflection of the first signal;

receiving, by way of the receiving antenna, a fourth signal comprising a single-tone interferometry signal, wherein the fourth signal comprises a reflection of the second signal;

determining signal information associated with the third and fourth signals;

calculating range and displacement information respective to the computing device based on said signal information; and visibly displaying, on a display associated with said computing device, range, displacement and gesture recognition based on the calculated range and displacement information.

22. The non-transitory computer-readable storage medium of claim 21, wherein:

said first and third signals comprise a chirped beat signal comprising an up-ramp linear frequency-modulated signal, and said second and fourth signals comprise an interferometry signal having a fixed operating frequency.

23. The non-transitory computer-readable storage medium of claim 21, further comprising monitoring micro-Doppler effects of an object using said interferometry signal, said micro-Doppler effects comprising physiological motion monitoring, gestures and other minor discrete movements.

24. A system comprising:

a transceiver defining a transmitting antenna and a receiving antenna; and a computing device coupled to the transceiver, the computing device comprising:

a processor; and a coupled to the processor, memory storing computer-executable instructions that are executable by the processor to cause the computing device to execute operations comprising:

a processor:

transmitting, via the transceiver, a first signal comprising frequency modulated continuous wave (FMCW) signal;

transmitting, via the transceiver and concurrent with the transmission of said first signal, a second signal, said transmission comprising a single-tone interferometry signal;

receiving, via the transceiver, a third signal comprising an FMCW signal, wherein the third signal comprises a reflection of the first signal;

receiving, via the transceiver, a fourth signal comprising a single-tone interferometry signal, wherein the fourth signal comprises a reflection of the second signal;

determining signal information associated with said received third signal and said received fourth signal;

calculating range and displacement information respective to the computing device based on said signal information; and visibly displaying, on a display associated with said computing device, range, displacement, clutter, and gesture recognition based on the calculated range and displacement information for object localization, physiological and movement monitoring.

* * * * *